United States Patent
Li et al.

(10) Patent No.: US 12,355,529 B2
(45) Date of Patent: Jul. 8, 2025

(54) TECHNIQUES FOR SIMPLIFYING CHANNEL STATE INFORMATION FEEDBACK

(71) Applicant: QUALCOMM INCORPORATED, San Diego, CA (US)

(72) Inventors: Qiaoyu Li, Beijing (CN); Chao Wei, Beijing (CN); Huilin Xu, Temecula, CA (US); Chenxi Hao, Beijing (CN); Jing Dai, Beijing (CN); Ruiming Zheng, Beijing (CN); Hao Xu, Beijing (CN); Jing Lei, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/759,704

(22) PCT Filed: Feb. 14, 2020

(86) PCT No.: PCT/CN2020/075210
§ 371 (c)(1),
(2) Date: Jul. 28, 2022

(87) PCT Pub. No.: WO2021/159445
PCT Pub. Date: Aug. 19, 2021

(65) Prior Publication Data
US 2023/0057169 A1    Feb. 23, 2023

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0057* (2013.01)

(58) Field of Classification Search
None
See application file for complete search history.

(56) References Cited

U.S. PATENT DOCUMENTS 11,121,754 B2 *  9/2021  Kang ............... H04B 7/0626
11,411,694 B2 *  8/2022  Kakishima ......... H04L 5/0048
(Continued)

FOREIGN PATENT DOCUMENTS

CN   107431515 A   12/2017
CN   108616345 A   10/2018
(Continued)

OTHER PUBLICATIONS

International Search Report and Written Opinion—PCT/CN2020/075210—ISAEPO—Nov. 4, 2020.
(Continued)

*Primary Examiner* — Duc T Duong
(74) *Attorney, Agent, or Firm* — Holland & Hart LLP/Qualcomm

(57) ABSTRACT

Methods, systems, and devices for wireless communications are described. A user equipment (UE) may transmit a capability report to a base station indicating a triggering offset. The base station may configure the UE with one or more channel state information (CSI) measurement resources and send downlink control information (DCI) that triggers an aperiodic CSI report for some of the CSI measurement resources. The UE may report CSI by measuring the CSI resources after the triggering offset. In some cases, CSI reporting related to the different codebook types (e. g., Type I, Type II) may be modified, where after identifying a type of codebook and determining which type of codebook to process (e. g., based on a number of CSI processing units), the UE may identify a priority associated with different CSI
(Continued)

reports. The UE may be configured with various parameters that relax or modify the processing of Type II CSI reports.

25 Claims, 20 Drawing Sheets

(51) Int. Cl.
*H04W 8/24* (2009.01)
*H04W 24/10* (2009.01)
*H04W 72/20* (2023.01)

(56) References Cited

U.S. PATENT DOCUMENTS

| | | | |
|---|---|---|---|
| 2019/0014559 A1 | 1/2019 | Davydov et al. | |
| 2019/0053084 A1* | 2/2019 | Hosseini | H04L 5/0094 |
| 2019/0053089 A1 | 2/2019 | Kwak et al. | |
| 2019/0229781 A1* | 7/2019 | Jin | H04B 7/0628 |
| 2020/0107319 A1* | 4/2020 | Bagheri | H04W 72/21 |
| 2020/0136690 A1* | 4/2020 | Noh | H04L 5/001 |
| 2020/0177254 A1* | 6/2020 | Lee | H04B 7/063 |
| 2020/0236692 A1* | 7/2020 | Lin | H04W 72/535 |
| 2020/0404525 A1* | 12/2020 | Rahman | H04L 5/0091 |
| 2021/0075486 A1* | 3/2021 | Song | H04L 1/0026 |
| 2021/0143870 A1* | 5/2021 | Faxér | H04L 5/0057 |
| 2021/0242926 A1* | 8/2021 | Yang | H04W 72/04 |
| 2021/0391906 A1* | 12/2021 | Oteri | H04L 5/0057 |
| 2021/0409175 A1* | 12/2021 | Matsumura | H04L 5/0023 |
| 2022/0039099 A1* | 2/2022 | Faxér | H04L 27/26025 |
| 2022/0239352 A1* | 7/2022 | Hakola | H04B 7/088 |
| 2023/0093335 A1* | 3/2023 | Harrison | H04B 7/0617 |
| | | | 370/329 |

FOREIGN PATENT DOCUMENTS

| | | |
|---|---|---|
| CN | 109155714 A | 1/2019 |
| CN | 110574304 A | 12/2019 |
| EP | 3509241 A1 | 7/2019 |
| WO | WO-2018218393 A1 | 12/2018 |
| WO | WO-2019099659 A1 | 5/2019 |

OTHER PUBLICATIONS

Qualcomm Incorporated: "Standalone Aperiodic CSI-RS Resource Set with Higher Layer Parameter Trs-Info Configured", 3GPP TSG-RAN1 Meeting #98, R1-1909289, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, 2 Pages, XP051765894, Section 5.1.6.1.1.
Spreadtrum Communications: "Remaining Issues on CSI Measurement", 3GPP TSG RAN WG1 Meeting #93, R1-1806392, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 11, 2018, 3 Pages, XP051461817, Section 2.3.
Supplementary Partial European Search Report—EP20919002—Search Authority—Munich—Oct. 16, 2023.
Supplementary European Search Report—EP20919002—Search Authority—Munich—Jan. 23, 2024.

* cited by examiner

TECHNIQUES FOR SIMPLIFYING CHANNEL STATE INFORMATION FEEDBACK

CROSS REFERENCE

The present application is a 371 national stage filing of International PCT Application No. PCT/CN2020/075210 by LI et al. entitled "TECHNIQUES FOR SIMPLIFYING CHANNEL STATE INFORMATION FEEDBACK," filed Feb. 14, 2020, which is assigned to the assignee hereof, and which is expressly incorporated by reference in its entirety herein.

FIELD OF TECHNOLOGY

The following relates generally to wireless communications and more specifically to techniques for simplifying channel state information feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a base station may configure a UE for aperiodic channel state information (CSI) reporting. However, in some examples, aperiodic CSI reporting may result in relatively high UE processing complexity (e.g., due to signal buffering at the UE). In other examples, a type of CSI codebook used for CSI reporting may place relatively high requirements on a UE. In either case, complex CSI reporting processes may cause delays, inefficient communications, and increased power consumption.

SUMMARY

The described techniques relate to improved methods, systems, devices, and apparatuses that support techniques for simplifying channel state information (CSI) feedback. Generally, the described techniques enable a network, such as a base station, to configure a user equipment (UE) with relaxed buffering for aperiodic CSI reporting. For example, the UE may transmit a capability report to the base station indicating a time delay (e.g., a triggering offset). The base station may configure the UE with one or more CSI measurement resources and send, to the UE, downlink control information (DCI) that triggers a CSI report for at least some of the configured CSI measurement resources. The UE may generate the CSI report based on the CSI measurement resources and the triggering offset, where the UE may not expect to receive the CSI measurement resources before the end of the triggering offset. The triggering offset may allow the UE time to decode the received DCI, thereby reducing the amount of signal buffering performed by the UE.

In some cases, the DCI may trigger CSI reporting associated with different codebook types (e.g., Type I, Type II codebooks). The CSI reporting related to the different codebook types may be modified to reduce the computational burden on a UE. For example, the UE may utilize a priority associated with different CSI codebook types, where the UE may identify the codebook type to be processed before identifying the priority. In some cases, when the UE is triggered to report CSI associated with a Type II codebook and CSI associated with a Type I codebook, the UE may identify a number of CSI processing units (CPUs) for updating the Type I and Type II codebooks, and may and may process the CSI based on the identified CPUs for each type of codebook, which may be further based on an identified priority. In other examples, the UE may be configured with various parameters (e.g., CSI processing time, maximum rank) that relax or modify the processing of Type II CSI reports, and the UE may process the Type II CSI reports differently than Type I CSI reports based on the parameters. Here, the various parameters may enable the UE to more efficiently generate CSI reports for codebooks associated with a relatively higher complexity (e.g., compared to other CSI reports associated with other codebooks).

A method of wireless communication at a UE is described. The method may include transmitting, to a base station, a capability report indicating an aperiodic CSI measurement resource triggering offset supported by the UE, receiving a configuration of one or more aperiodic CSI measurement resources, receiving DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset, and transmitting, to the base station, a CSI report indicating a measurement of the first subset of aperiodic CSI measurement resources.

An apparatus for wireless communication at a UE is described. The apparatus may include a processor, memory coupled with the processor, and instructions stored in the memory. The instructions may be executable by the processor to cause the apparatus to transmit, to a base station, a capability report indicating an aperiodic CSI measurement resource triggering offset supported by the UE, receive a configuration of one or more aperiodic CSI measurement resources, receive DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset, and transmit, to the base station, a CSI report indicating a measurement of the first subset of aperiodic CSI measurement resources.

Another apparatus for wireless communication at a UE is described. The apparatus may include means for transmitting, to a base station, a capability report indicating an aperiodic CSI measurement resource triggering offset supported by the UE, receiving a configuration of one or more aperiodic CSI measurement resources, receiving DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset, and transmitting, to the base station, a CSI report indicating a measurement of the first subset of aperiodic CSI measurement resources.

A non-transitory computer-readable medium storing code for wireless communication at a UE is described. The code may include instructions executable by a processor to transmit, to a base station, a capability report indicating an aperiodic CSI measurement resource triggering offset supported by the UE, receive a configuration of one or more aperiodic CSI measurement resources, receive DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset, and transmit, to the base station, a CSI report indicating a measurement of the first subset of aperiodic CSI measurement resources.

In some examples of the method, apparatuses, and non-transitory computer-readable medium described herein, transmitting the capability report may include operations, features, means, or instructions for transmitting the capability report indicating the aperiodic CSI measurement resource triggering offset that may be a threshold duration after which the UE may be capable of receiving the one or more aperiodic CSI measurement resources relative to receiving the DCI.

In some examples of the method, apparatuses, and non-transitory computer-readable medium described herein, transmitting the capability report may include operations, features, means, or instructions for transmitting the capability report indicating the aperiodic CSI measurement resource triggering offset that indicates a processing time supported by the UE for decoding the DCI. In some examples of the method, apparatuses, and non-transitory computer-readable medium described herein, the aperiodic CSI measurement resource triggering offset indicates one or more symbol periods, one or more slot durations, or a combination thereof.

In some examples of the method, apparatuses, and non-transitory computer-readable medium described herein, transmitting the capability report may include operations, features, means, or instructions for transmitting the capability report indicating a threshold number of aperiodic CSI measurement resources associated with the CSI report that the UE may be capable of measuring, where the CSI report includes a measurement for at least one of the one or more aperiodic CSI measurement resources up to the threshold number of aperiodic CSI measurement resources.

In some examples of the method, apparatuses, and non-transitory computer-readable medium described herein, the threshold number of aperiodic CSI measurement resources indicates a maximum number of aperiodic CSI measurement resources associated with the CSI report that the UE may be capable of measuring.

Some examples of the method, apparatuses, and non-transitory computer-readable medium described herein may further include operations, features, means, or instructions for transmitting the capability report including an indication of a buffering memory size, where the configuration of the one or more aperiodic CSI measurement resources may be based on the buffering memory size. In some examples of the method, apparatuses, and non-transitory computer-readable medium described herein, the CSI report includes an aperiodic CSI report.

A method of wireless communication at a UE is described. The method may include receiving, from a base station, DCI that triggers a first CSI report associated with a first type of codebook and a second CSI report associated with a second type of codebook that differs from the first type of codebook, generating, based on the first type of codebook and the second type of codebook, one of the first CSI report or the second CSI report using a set of one or more CPUs, where the first CSI report is processed using each CPU of the set of one or more CPUs based on the first type of codebook, or where the second CSI report is processed using a subset of CPUs of the set of one or more CPUs based on the second type of codebook, or a combination thereof, and transmitting the generated CSI report.

An apparatus for wireless communication at a UE is described. The apparatus may include a processor, memory coupled with the processor, and instructions stored in the memory. The instructions may be executable by the processor to cause the apparatus to receive, from a base station, DCI that triggers a first CSI report associated with a first type of codebook and a second CSI report associated with a second type of codebook that differs from the first type of codebook, generate, based on the first type of codebook and the second type of codebook, one of the first CSI report or the second CSI report using a set of one or more CPUs, where the first CSI report is processed using each CPU of the set of one or more CPUs based on the first type of codebook, or where the second CSI report is processed using a subset of CPUs of the set of one or more CPUs based on the second type of codebook, or a combination thereof, and transmit the generated CSI report.

Another apparatus for wireless communication at a UE is described. The apparatus may include means for receiving, from a base station, DCI that triggers a first CSI report associated with a first type of codebook and a second CSI report associated with a second type of codebook that differs from the first type of codebook, generating, based on the first type of codebook and the second type of codebook, one of the first CSI report or the second CSI report using a set of one or more CPUs, where the first CSI report is processed using each CPU of the set of one or more CPUs based on the first type of codebook, or where the second CSI report is processed using a subset of CPUs of the set of one or more CPUs based on the second type of codebook, or a combination thereof, and transmitting the generated CSI report.

A non-transitory computer-readable medium storing code for wireless communication at a UE is described. The code may include instructions executable by a processor to receive, from a base station, DCI that triggers a first CSI report associated with a first type of codebook and a second CSI report associated with a second type of codebook that differs from the first type of codebook, generate, based on the first type of codebook and the second type of codebook, one of the first CSI report or the second CSI report using a set of one or more CPUs, where the first CSI report is processed using each CPU of the set of one or more CPUs based on the first type of codebook, or where the second CSI report is processed using a subset of CPUs of the set of one or more CPUs based on the second type of codebook, or a combination thereof, and transmit the generated CSI report.

Some examples of the method, apparatuses, and non-transitory computer-readable medium described herein may further include operations, features, means, or instructions for identifying that the first CSI report may have priority over the second CSI report, and refraining from updating the second CSI report based on using each CPU of the set of one or more CPUs for generating the first CSI report. In some examples of the method, apparatuses, and non-transitory computer-readable medium described herein, transmitting the generated CSI report includes transmitting the first CSI report.

Some examples of the method, apparatuses, and non-transitory computer-readable medium described herein may further include operations, features, means, or instructions for identifying that the second CSI report may have a higher priority than the first CSI report, and refraining from updating the first CSI report based on using the subset of CPUs of the set of one or more CPUs for generating the second CSI report. In some examples of the method, apparatuses, and non-transitory computer-readable medium described herein, transmitting the generated CSI report includes transmitting the second CSI report. In some examples of the method, apparatuses, and non-transitory computer-readable medium described herein, the first type of codebook includes a Type II CSI codebook.

A method of wireless communication at a UE is described. The method may include receiving DCI triggering a first CSI report associated with a first type of codebook, or a second CSI report associated with a second type of codebook that differs from the first type of codebook, or a combination thereof, generating the first CSI report using a first parameter set and the first type of codebook, or the second CSI report using a second parameter set and the second type of codebook, or a combination thereof, based on the received DCI, and transmitting the first CSI report, or the second CSI report, or a combination thereof.

An apparatus for wireless communication at a UE is described. The apparatus may include a processor, memory coupled with the processor, and instructions stored in the memory. The instructions may be executable by the processor to cause the apparatus to receive DCI triggering a first CSI report associated with a first type of codebook, or a second CSI report associated with a second type of codebook that differs from the first type of codebook, or a combination thereof, generate the first CSI report using a first parameter set and the first type of codebook, or the second CSI report using a second parameter set and the second type of codebook, or a combination thereof, based on the received DCI, and transmit the first CSI report, or the second CSI report, or a combination thereof.

Another apparatus for wireless communication at a UE is described. The apparatus may include means for receiving DCI triggering a first CSI report associated with a first type of codebook, or a second CSI report associated with a second type of codebook that differs from the first type of codebook, or a combination thereof, generating the first CSI report using a first parameter set and the first type of codebook, or the second CSI report using a second parameter set and the second type of codebook, or a combination thereof, based on the received DCI, and transmitting the first CSI report, or the second CSI report, or a combination thereof.

A non-transitory computer-readable medium storing code for wireless communication at a UE is described. The code may include instructions executable by a processor to receive DCI triggering a first CSI report associated with a first type of codebook, or a second CSI report associated with a second type of codebook that differs from the first type of codebook, or a combination thereof, generate the first CSI report using a first parameter set and the first type of codebook, or the second CSI report using a second parameter set and the second type of codebook, or a combination thereof, based on the received DCI, and transmit the first CSI report, or the second CSI report, or a combination thereof.

In some examples of the method, apparatuses, and non-transitory computer-readable medium described herein, generating the first CSI report may include operations, features, means, or instructions for identifying, from the first parameter set, a first set of CSI computation times associated with the first CSI report, the first set of CSI computation times being different from a second set of CSI computation times associated with the second CSI report. Some examples of the method, apparatuses, and non-transitory computer-readable medium described herein may further include operations, features, means, or instructions for transmitting the first CSI report based on the first set of CSI computation times.

In some examples of the method, apparatuses, and non-transitory computer-readable medium described herein, generating the second CSI report may include operations, features, means, or instructions for identifying, from the second parameter set, the second set of CSI computation times associated with the second CSI report, the second set of CSI computation times being different from the first set of CSI computation times associated with the first CSI report. Some examples of the method, apparatuses, and non-transitory computer-readable medium described herein may further include operations, features, means, or instructions for transmitting the second CSI report based on the second set of CSI computation times.

In some examples of the method, apparatuses, and non-transitory computer-readable medium described herein, generating the first CSI report may include operations, features, means, or instructions for identifying a rank threshold value associated with the first CSI report based on the first parameter set. Some examples of the method, apparatuses, and non-transitory computer-readable medium described herein may further include operations, features, means, or instructions for transmitting the first CSI report excluding a rank indicator (RI) based on the rank threshold value.

Some examples of the method, apparatuses, and non-transitory computer-readable medium described herein may further include operations, features, means, or instructions for identifying a first set of one or more aperiodic CSI measurement resources based on the first parameter set, the first set of one or more aperiodic CSI measurement resources being configured for aperiodic CSI reporting. Some examples of the method, apparatuses, and non-transitory computer-readable medium described herein may further include operations, features, means, or instructions for transmitting the first CSI report that may be generated based on measurement of the one or more aperiodic CSI measurement resources.

Some examples of the method, apparatuses, and non-transitory computer-readable medium described herein may further include operations, features, means, or instructions for transmitting a capability report including a first capability indication of the UE capability for concurrent generation of the first CSI report and the second CSI report, a second capability indication for generation of the first CSI report individually, a third capability indication for generation of the second CSI report individually, or a combination thereof.

In some examples of the method, apparatuses, and non-transitory computer-readable medium described herein, the first CSI report includes a wide band CSI report. Some examples of the method, apparatuses, and non-transitory computer-readable medium described herein may further include operations, features, means, or instructions for receiving, from a base station, an indication of the first parameter set and the second parameter set.

In some examples of the method, apparatuses, and non-transitory computer-readable medium described herein, the first type of codebook includes a Type II CSI codebook. In some examples of the method, apparatuses, and non-transitory computer-readable medium described herein, at least a portion of the first parameter set may be different from the second parameter set.

A method of wireless communication at a base station is described. The method may include receiving, from a UE, a capability report including an indication of CSI reporting capability supported by the UE, identifying, based on the received capability report, a threshold number of aperiodic CSI measurement resources, a UE memory size associated with buffering aperiodic CSI measurement resources, or a combination thereof, transmitting a configuration of one or more aperiodic CSI measurement resources for CSI reporting by the UE, the configuration being based on the threshold number of aperiodic CSI measurement resources, or the UE memory size, or a combination thereof, and transmitting, to the UE, DCI triggering the CSI reporting for a subset of aperiodic CSI measurement resources of the one or more aperiodic CSI measurement resources.

An apparatus for wireless communication at a base station is described. The apparatus may include a processor, memory coupled with the processor, and instructions stored in the memory. The instructions may be executable by the processor to cause the apparatus to receive, from a UE, a capability report including an indication of CSI reporting capability supported by the UE, identify, based on the received capability report, a threshold number of aperiodic CSI measurement resources, a UE memory size associated with buffering aperiodic CSI measurement resources, or a combination thereof, transmit a configuration of one or more aperiodic CSI measurement resources for CSI reporting by the UE, the configuration being based on the threshold number of aperiodic CSI measurement resources, or the UE memory size, or a combination thereof, and transmit, to the UE, DCI triggering the CSI reporting for a subset of aperiodic CSI measurement resources of the one or more aperiodic CSI measurement resources.

Another apparatus for wireless communication at a base station is described. The apparatus may include means for receiving, from a UE, a capability report including an indication of CSI reporting capability supported by the UE, identifying, based on the received capability report, a threshold number of aperiodic CSI measurement resources, a UE memory size associated with buffering aperiodic CSI measurement resources, or a combination thereof, transmitting a configuration of one or more aperiodic CSI measurement resources for CSI reporting by the UE, the configuration being based on the threshold number of aperiodic CSI measurement resources, or the UE memory size, or a combination thereof, and transmitting, to the UE, DCI triggering the CSI reporting for a subset of aperiodic CSI measurement resources of the one or more aperiodic CSI measurement resources.

A non-transitory computer-readable medium storing code for wireless communication at a base station is described. The code may include instructions executable by a processor to receive, from a UE, a capability report including an indication of CSI reporting capability supported by the UE, identify, based on the received capability report, a threshold number of aperiodic CSI measurement resources, a UE memory size associated with buffering aperiodic CSI measurement resources, or a combination thereof, transmit a configuration of one or more aperiodic CSI measurement resources for CSI reporting by the UE, the configuration being based on the threshold number of aperiodic CSI measurement resources, or the UE memory size, or a combination thereof, and transmit, to the UE, DCI triggering the CSI reporting for a subset of aperiodic CSI measurement resources of the one or more aperiodic CSI measurement resources.

In some examples of the method, apparatuses, and non-transitory computer-readable medium described herein, the received capability report includes an indication of the UE memory size, where the UE memory size indicates one or more symbol periods of a reception bandwidth for receiving the one or more aperiodic CSI measurement resources.

In some examples of the method, apparatuses, and non-transitory computer-readable medium described herein, the threshold number of aperiodic CSI measurement resources indicates a maximum number of aperiodic CSI measurement resources associated with the CSI reporting that the UE may be capable of measuring.

A method of wireless communication at a base station is described. The method may include configuring a first parameter set for a first CSI report associated with a first type of codebook and a second parameter set for a second CSI report associated with a second type of codebook that differs from the first type of codebook, transmitting, to a UE, DCI triggering the first CSI report, or the second CSI report, or a combination thereof, and receiving, from the UE, the first CSI report, or the second CSI report, or a combination thereof, based on the received DCI, where the first CSI report is based on the first parameter set, the second CSI report is based on the second parameter set, or a combination thereof.

An apparatus for wireless communication at a base station is described. The apparatus may include a processor, memory coupled with the processor, and instructions stored in the memory. The instructions may be executable by the processor to cause the apparatus to configure a first parameter set for a first CSI report associated with a first type of codebook and a second parameter set for a second CSI report associated with a second type of codebook that differs from the first type of codebook, transmit, to a UE, DCI triggering the first CSI report, or the second CSI report, or a combination thereof, and receive, from the UE, the first CSI report, or the second CSI report, or a combination thereof, based on the received DCI, where the first CSI report is based on the first parameter set, the second CSI report is based on the second parameter set, or a combination thereof.

Another apparatus for wireless communication at a base station is described. The apparatus may include means for configuring a first parameter set for a first CSI report associated with a first type of codebook and a second parameter set for a second CSI report associated with a second type of codebook that differs from the first type of codebook, transmitting, to a UE, DCI triggering the first CSI report, or the second CSI report, or a combination thereof, and receiving, from the UE, the first CSI report, or the second CSI report, or a combination thereof, based on the received DCI, where the first CSI report is based on the first parameter set, the second CSI report is based on the second parameter set, or a combination thereof.

A non-transitory computer-readable medium storing code for wireless communication at a base station is described. The code may include instructions executable by a processor to configure a first parameter set for a first CSI report associated with a first type of codebook and a second parameter set for a second CSI report associated with a second type of codebook that differs from the first type of codebook, transmit, to a UE, DCI triggering the first CSI report, or the second CSI report, or a combination thereof, and receive, from the UE, the first CSI report, or the second CSI report, or a combination thereof, based on the received DCI, where the first CSI report is based on the first parameter set, the second CSI report is based on the second parameter set, or a combination thereof.

Some examples of the method, apparatuses, and non-transitory computer-readable medium described herein may further include operations, features, means, or instructions for configuring a first set of CSI computation times associated with the first CSI report, the first set of CSI computation times being different from a second set of CSI computation times associated with the second CSI report. Some examples of the method, apparatuses, and non-transitory computer-readable medium described herein may further include operations, features, means, or instructions for receiving the first CSI report based on the first set of CSI computation times.

Some examples of the method, apparatuses, and non-transitory computer-readable medium described herein may further include operations, features, means, or instructions for configuring the second set of CSI computation times associated with the second CSI report, the second set of CSI computation times being different from the first set of CSI computation times associated with the first CSI report. Some examples of the method, apparatuses, and non-transitory computer-readable medium described herein may further include operations, features, means, or instructions for receiving the second CSI report based on the second set of CSI computation times Some examples of the method, apparatuses, and non-transitory computer-readable medium described herein may further include operations, features, means, or instructions for configuring a rank threshold value associated with the first CSI report based on the first parameter set. Some examples of the method, apparatuses, and non-transitory computer-readable medium described herein may further include operations, features, means, or instructions for receiving the first CSI report excluding an RI based on the rank threshold value.

Some examples of the method, apparatuses, and non-transitory computer-readable medium described herein may further include operations, features, means, or instructions for configuring a first set of one or more aperiodic CSI measurement resources based on the first parameter set, the first set of one or more aperiodic CSI measurement resources being configured for aperiodic CSI reporting. Some examples of the method, apparatuses, and non-transitory computer-readable medium described herein may further include operations, features, means, or instructions for receiving the first CSI report over the one or more aperiodic CSI measurement resources.

Some examples of the method, apparatuses, and non-transitory computer-readable medium described herein may further include operations, features, means, or instructions for receiving a capability report from the UE, and identifying, from the capability report, a first capability indication for concurrent generation of the first CSI report and the second CSI report, a second capability indication for generation of the first CSI report individually, a third capability indication for generation of the second CSI report individually, or a combination thereof.

In some examples of the method, apparatuses, and non-transitory computer-readable medium described herein, the first CSI report includes a wide band CSI report. Some examples of the method, apparatuses, and non-transitory computer-readable medium described herein may further include operations, features, means, or instructions for transmitting, to the UE, an indication of the first parameter set and the second parameter set.

In some examples of the method, apparatuses, and non-transitory computer-readable medium described herein, the first type of codebook includes a Type II CSI codebook. In some examples of the method, apparatuses, and non-transitory computer-readable medium described herein, at least a portion of the first parameter set may be different from the second parameter set.

DETAILED DESCRIPTION

Figure 1:
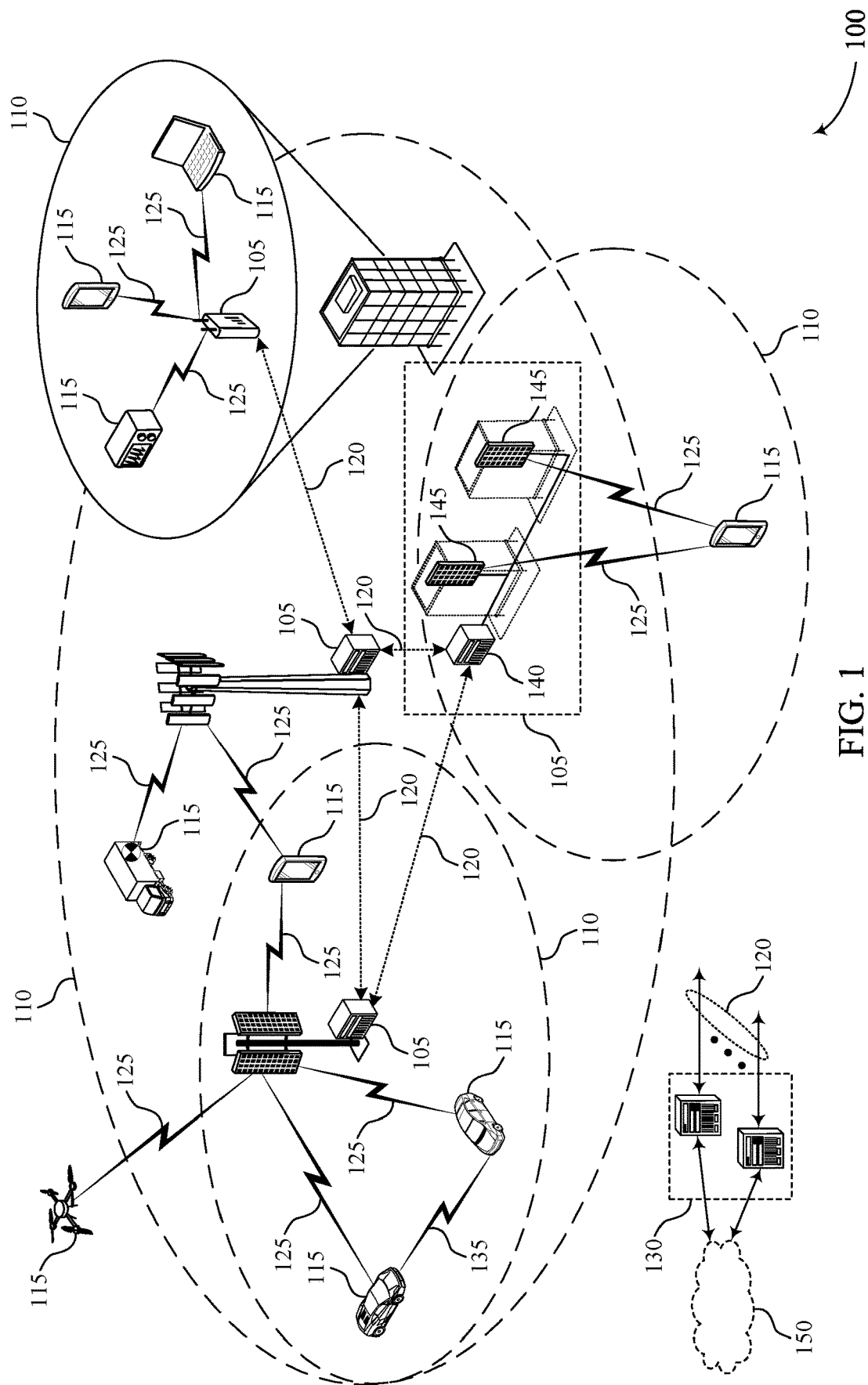
FIG. 1 illustrates an example of a system for wireless communications that supports techniques for simplifying channel state information (CSI) feedback in accordance with aspects of the present disclosure.

In some wireless communication systems, a user equipment (UE) may report channel state information (CSI) to a base station. The CSI reporting may involve a number of CSI measurement resources, and the reporting may be configured a periodic, aperiodic, or semi-persistent. For example, the base station may configure the UE with one or more CSI measurement resources (e.g., resources carrying CSI-reference signals (RSs)) for aperiodic CSI reporting. The UE, however, may not know which CSI resource(s) to measure until after downlink control information (DCI) from the base station triggers an aperiodic CSI report. In particular, the DCI may indicate to the UE which resources to use for the CSI report, and the UE may decode the DCI to identify which CSI resources to use for the CSI reporting. Thus, when a UE receives DCI that triggers an aperiodic CSI report, the UE may buffer received signaling (e.g., in active and non-active bandwidth parts (BWPs)) until the DCI is decoded. This buffering may result in relatively high power consumption and complexity requirements (such as memory size and sampling capabilities) at the UE. However, such buffering requirements may be limited for some types of UEs, including low-complexity UEs (e.g., UEs having a reduced number of antennas, reduces transmission or reception bandwidth, reduced computational complexity, etc.). Such UEs may be referred to as New Radio (NR) light UEs.

Further, a UE may support CSI reporting using different types of codebooks (e.g., Type I single panel, Type I multiple panel, Type II, or a combination thereof). The UE may report a codebook capability to the base station, and the base station considers the codebook capability when configuring CSI reports for the UE. The UE may indicate codebook capability information in one or more lists for each codebook type. For example, the lists may include a maximum number of transmit antenna ports per CSI resource, a maximum number of CSI resources, and a maximum number of total transmit antenna ports per band. However, a low-complexity UE (e.g., NR light UE) may under-report UE capabilities to the base station to maintain support of CSI reporting using the one or more codebook types, which may reduce the effectiveness of the CSI reporting as well as increase interference for other UEs if the UE is grouped (e.g., for multiple user (MU)-multiple-input multiple-output (MIMO) transmissions). As such, it may be desirable to utilize techniques that simplify CSI feedback at the UE.

Accordingly, the techniques described herein may enable a UE to perform a CSI feedback procedure according to relaxed buffering requirements for aperiodic CSI reporting, which may allow a UE to reduce complexity related to CSI feedback, thereby improving power consumption and latency in the system by easing the processing burden on the UE. Aspects of the present disclosure provide for the use of a time delay or triggering offset (e.g., a CSI measurement resource triggering offset), which may be a time delay between receiving DCI that triggers an aperiodic CSI report and the beginning of the CSI measurement resources used for the corresponding measurement. The UE may not expect to receive configured CSI reference signals (RSs) for the CSI report triggered by the DCI until after the triggering offset, thereby allowing the UE time to decode the received DCI and reducing the amount of buffering performed by the UE. In other examples, the number of configured aperiodic CSI resources for CSI measurements may be limited, which may allow the UE to buffer less data while decoding DCI (e.g., due to a decreased number of resources including CSI-RSs that may potentially be used for measurements). Additionally or alternatively, the configuration of the CSI resources may be based on the UE's reported buffering capabilities (e.g., a size of its memory), which may be reported in terms of a number of symbol periods for a reception bandwidth.

Additionally, CSI reporting using different codebook types (e.g., Type I, Type II) may be modified to reduce the computational burden on a UE. For example, the UE may utilize a priority associated with different CSI codebook types, where the UE may not be expected to support concurrent CSI when at least Type II CSI is triggered. In some cases, when the UE is triggered to report CSI associated with a Type II codebook and CSI associated with a Type I codebook, the UE may identify a priority for each type of CSI report, and may process the CSI based on the identified priority. In other examples, the UE may be configured with various parameters (e.g., CSI processing time, maximum rank) that relax or modify the processing of Type II CSI reports. The UE may also report its capability to support concurrent Type I and Type II codebook CSI reporting schemes, and the network may configure the UE according to the reported capability. In other cases, the configuration of CSI may be adjusted, where only wide-band CSI reporting may be configured by the UE (where sub-band CSI may not be supported). The UE may perform simplified CSI reporting, which may result in reduced complexity for UE processing and power consumption, among other benefits.

Aspects of the disclosure are initially described in the context of wireless communications systems. Additional aspects of the disclosure are described with reference to a signaling scheme and processing diagrams. Aspects of the disclosure are further illustrated by and described with reference to apparatus diagrams, system diagrams, and flowcharts that relate to techniques for simplifying CSI feedback.

FIG. 1 illustrates an example of a wireless communications system 100 that supports techniques for simplifying CSI feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single bandwidth part (BWP) for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and MU-MIMO, where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may gather channel condition information from a UE 115 in order to efficiently configure schedule the channel. This information may be sent from the UE 115 in the form of a channel state report (or CSI report). A channel state report may contain a rank indicator (RI) requesting a number of layers to be used for downlink transmissions (e.g., based on antenna ports of the UE 115), a precoding matric indicator (PMI) indicating a preference for which precoder matrix should be used (e.g., based on a number of layers), and a channel quality indicator (CQI) representing a highest modulation and coding scheme (MCS) that may be used. CQI may be calculated by a UE 115 after receiving predetermined pilot symbols such as cell-specific reference signals (CRS) or CSI-RS.

In some examples, the types of information included in the CSI report determines a reporting type. CSI may be periodic or aperiodic. Further, CSI reports may have different types based on a codebook used to generate the report. For instance, a Type I CSI report may be based on a first codebook and a Type II CSI report may be based on a second codebook, where the first and second codebooks may be based on different antenna configurations. In some cases, the use of either Type I or Type II CSI reports may improve MIMO performance (as compared to other types of CSI reports). In some cases, a Type II CSI report may be carried at least on a PUSCH, and may provide CSI to a base station 105 with a relatively higher level of granularity (e.g., for MU-MIMO services).

For CSI, there may be an active time period which is defined from a triggering DCI to the time period (e.g., slot) that a UE 115 sends the corresponding CSI report. As described herein, in a case of "non-concurrent" CSI reporting, it means that a UE 115 may not update Type I CSI reporting when Type 2 CSI reporting is active (alternatively no updating Type II CSI reporting when Type II CSI reporting is active), even in cases where Type I and Type II CSI reports are not triggered at the same time. Here, wireless communications system 100 may support a time-division multiplexing of CSI processing, where a UE 115 may first identify a type of CSI report before updating one or more CSI reports (e.g., which may further be based on a priority of respective CSI reports).

Wireless communications system 100 may support simplified CSI feedback procedures. For example, a base station 105 may configure a UE 115 with relaxed buffering requirements for aperiodic CSI reporting. In such cases, the UE 115 may transmit a capability report to the base station 105 indicating a time delay (e.g., triggering offset). The base station 105 may configure the UE 115 with one or more CSI resources. Additionally, the base station 105 may send DCI that triggers a CSI report to the UE 115. The UE 115 may perform the CSI report according to the CSI resources and the triggering offset. The triggering offset may allow the UE 115 time to decode the received DCI, thereby reducing the amount of signal buffering performed by the UE 115. In some examples, the UE 115 may have limited capabilities when compared with other UEs 115 (e.g., UE 115 may be a low-complexity UE 115, which may be referred to as an NR light UE 115). The UE 115 may be a wearable smart device, an industrial sensor, a video surveillance device, or any other device with reduced complexity.

In some cases, the DCI may trigger CSI reporting associated with different codebook types (e.g., Type I, Type II). The CSI reporting related to the different codebook types may be modified to reduce the computational burden on the UE 115. For example, the UE 115 may utilize a priority associated with different CSI codebook types. In some cases, when the UE 115 is triggered to report CSI associated with a Type II codebook and CSI associated with a Type I codebook, the UE 115 may identify a priority for each type of CSI report, and may process the CSI based on the identified priority. In other examples, the UE 115 may be configured with various parameters (e.g., CSI processing time, maximum rank) that relax or modify the processing of Type II CSI reports, where respective parameters may correspond to reporting CSI for different codebook types.

Figure 2:
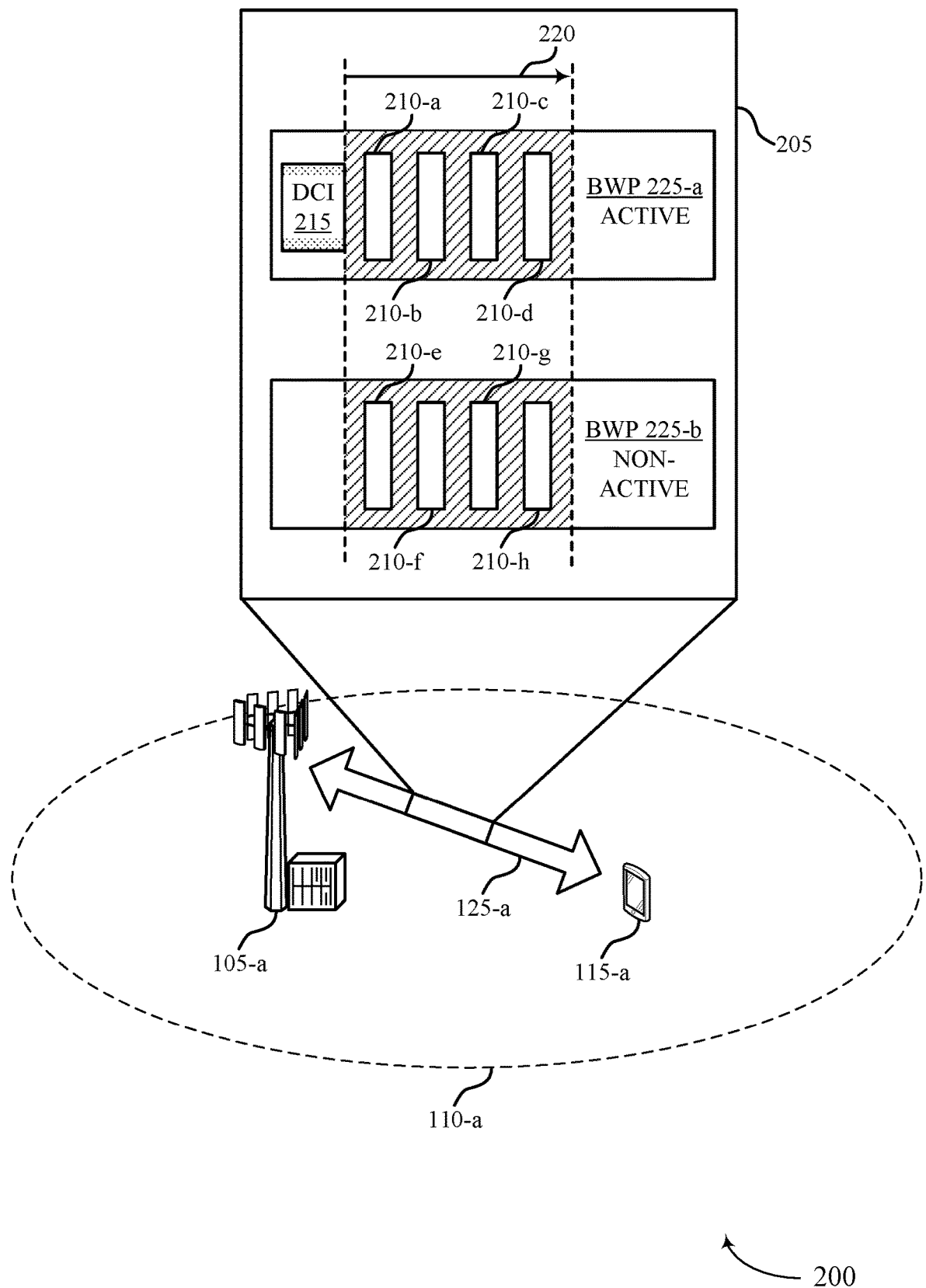
FIG. 2 illustrates an example of a wireless communications system that supports techniques for simplifying CSI feedback in accordance with aspects of the present disclosure.

FIG. 2 illustrates an example of a wireless communications system 200 that supports techniques for simplifying CSI feedback in accordance with aspects of the present disclosure. In some examples, wireless communications system 200 may implement aspects of wireless communications system 100 and may include UE 115-a and base station 105-a with coverage area 110-a, which may be examples of a UE 115 and base station 105 described with reference to FIG. 1. For example, UE 115-a and base station 105-a may transmit and receive control information and data via communication link 125-a during a signaling window 205. In some cases, UE 115-a may have reduced capabilities relative to other UEs 115. For example, UE 115-a may be an NR light UE 115, such as a wearable device, industrial sensor, video surveillance device, and the like. Additionally, UE 115-a may have a reduced number of receive antennas, reduced transmission or reception bandwidth (e.g., 5 MHz-20 MHz compared to 100 MHz bandwidth for other UEs 115), reduced computational complexity and memory, and increased battery life requirements when compared with traditional UEs 115. As described herein, base station 105-a may configure UE 115-a according to a simplified CSI feedback procedure (e.g., to enhance co-existence between UEs 115 operating according to different complexities).

For example, base station 105-a may configure UE 115-a to perform aperiodic CSI reporting using one or more CSI resources 210 (e.g., resources carrying aperiodic CSI-RSs). In some cases, base station 105-a may dynamically indicate the CSI resources 210 that UE 115-a may use to perform CSI measurements. For example, base station 105-a may transmit control information, such as DCI 215, to UE 115-a. The DCI 215 may trigger an aperiodic CSI report and may indicate corresponding CSI resources 210 that UE 115-a may use (e.g., one or more of CSI resources 210-a, 210-b, 210-c, 210-d, 210-e, 210-f, 210-g, or 210-h). In some cases, UE 115-a may not know which CSI resource 210 to perform measurements with until after the DCI 215 triggers the aperiodic CSI report and indicates the configured resource to be used. Thus, UE 115-a may buffer the received signaling during signaling duration 220, which may include the configured CSI resources 210 received in active BWP 225-a and non-active BWP 225-b. Buffering data in an on the fly manner may, however, result in high memory and sampling capabilities requirements for UE 115-a.

Further, UE 115-a may be expected to support CSI reporting using different types of codebooks (e.g., corresponding to a codebook capability for UE 115-a). For example, UE 115-a may support Type I single panel or Type I multiple panel CSI feedback. In some cases, Type I CSI feedback may include codebook-based precoding matrix indicator (PMI) feedback with relatively normal spatial resolution. Additionally or alternatively, UE 115-a may support a Type II CSI feedback. Type II CSI feedback may be an enhanced feedback scheme, enabling explicit feedback or codebook-based feedback with relatively high spatial resolution.

In some cases, UE 115-a may report codebook capability, including codebook type, for a band. For each codebook type, there may be one or more lists. Each list may include parameters that indicate codebook capability corresponding to the band. In some examples, the parameters may include maximum number of ports per CSI resource (maxNumberTxPortsPerResource), maximum number of CSI resources per band (maxNumberResourcesPerBand), and maximum total number of ports per band (totalNumberTxPortsPerBand). Base station 105-a may consider the reported capability parameters to configure CSI reports for UE 115-a. In some cases, UE 115-a may be configured, or triggered, with multiple types of codebook-based CSI reports, thus may support concurrent codebooks with mixed types. For example, UE 115-a may be triggered with Type I single panel or Type I multiple panel and Type II CSI types. The Type II CSI may involve calculations that are relatively more complex than Type I CSI calculations. In such examples, UE 115-a may underreport a Type II CSI codebook capability so base station 105-a may jointly consider one list for the Type I CSI and one list for the Type II CSI. That is, UE 115-a may underreport a maximum number of ports, a maximum number of CSI resources (e.g., 2 instead of 4), or a maximum total number of ports (e.g., 8 instead of 16) such that both CSI codebook types may be supported concurrently.

If capability for Type II CSI is underreported (e.g., due to limited complexity at UE 115-a), then the performance of Type II CSI might be limited. For example, reducing the number of beamforming ports or resources for a band may degrade the reporting granularity. In some cases, if UE 115-a supported a Type II CSI codebook for CSI reporting, base station 105-a may pair UE 115-a, which may be an NR light UE 115, with a UE 115 with higher complexity (e.g., a premium UE 115) for MU-MIMO. In such cases, underreporting a Type II CSI codebook capability at UE 115-a may result in higher interference between the UE 115 and UE 115-a.

As described herein, wireless communications system 200 may support the use of techniques that relax a buffering capability or processing for Type II CSI at UE 115-a while maintaining performance. For example, and as described in further detail with respect to FIG. 3, UE 115-a may be configured with a time delay or triggering offset (e.g., a CSI measurement resource triggering offset), which may be the time between receiving a DCI 215 that triggers an aperiodic CSI report and the beginning of the CSI resources 210 used for the corresponding measurement. As such, UE 115-a may not expect to receive any configured CSI-RSs for the CSI report triggered by the DCI 215 until after the triggering offset, thereby allowing UE 115-a time to decode the received DCI 215 and reducing the amount of buffering performed by UE 115-a. In other examples, the number of configured aperiodic CSI resources 210 for CSI measurements may be limited, which may allow UE 115-a to buffer less data while decoding the DCI 215 (e.g., due to a decreased number of resources including CSI-RSs that may potentially be used for measurements). Additionally or alternatively, the configuration of the CSI resources 210 may be based on the reported buffering capabilities by UE 115-a (e.g., a size of its memory), which may be reported in terms of a number of symbol periods for a reception bandwidth.

Additionally, CSI reporting using different CSI codebook types (e.g., Type I, Type II) may be modified to reduce the computational burden on UE 115-a. For example, and as described in further detail with reference to FIGS. 4A and 4B, UE 115-a may identify a type of CSI report (e.g., a type of CSI codebook) and further utilize a priority associated with different CSI codebook types, where UE 115-a may not be expected to support concurrent CSI when at least Type II CSI is triggered. In some cases, when UE 115-a is triggered to report CSI associated with a Type II codebook and CSI associated with a Type I codebook, UE 115-a may identify a priority for each type of CSI report, and may process the CSI based on the identified priority. In other examples, UE 115-a may be configured with various parameters (e.g., CSI processing time, maximum rank) that relax or modify the processing of Type II CSI reports. UE 115-a may also report its capability to support concurrent Type I and Type II CSI codebook reporting schemes, and a base station 105 may configure UE 115-a according to the reported capability. In other cases, the configuration of CSI may be adjusted, where only wide-band CSI reporting may be configured by UE 115-*a* (where sub-band CSI may not be supported). UE 115-*a* may perform simplified CSI reporting, which may result in reduced complexity for UE processing and power consumption, among other benefits.

Figure 3:
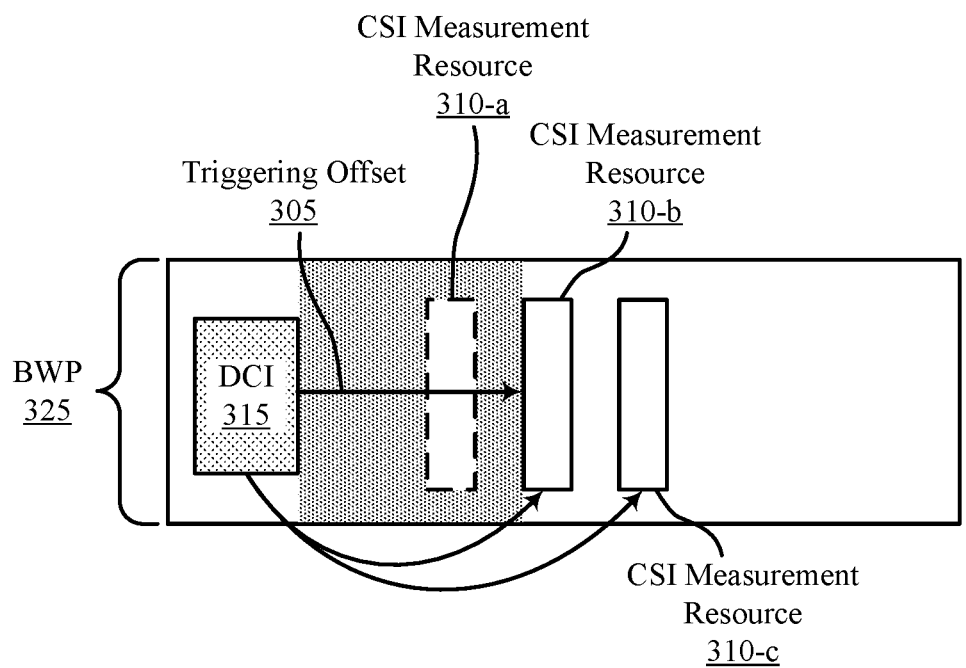
FIG. 3 illustrates an example of a signaling scheme that supports techniques for simplifying CSI feedback in accordance with aspects of the present disclosure.

FIG. 3 illustrates an example of a signaling scheme 300 that supports techniques for simplifying CSI feedback in accordance with aspects of the present disclosure. In some examples, signaling scheme 300 may implement aspects of wireless communications system 100 and/or 200. For instance, signaling scheme 300 may illustrate a BWP 325 in which a UE 115 performs a CSI measurement based on a configured time delay (e.g., triggering offset 305). Signaling scheme 300 includes CSI resources 310, a triggering DCI 315, and a BWP 325, which may be respective examples of CSI resources 210, a triggering DCI 215, and a BWP 225 as described with reference to FIG. 2. In some examples, a base station 105 may configure the UE 115 (e.g., via RRC signaling) with one or more aperiodic CSI resources 310 within one or more BWPs 325. For example, the UE 115 may be configured with CSI resource 310-*a*, CSI resource 310-*b*, and CSI resource 310-*c*.

In some cases, a UE 115 may identify a time delay (e.g., a triggering offset 305) based on an indication from the base station 105, a predetermined value, or a UE configuration. In some cases, the UE 115 may report a capability indicating a minimum non-zero triggering offset 305. The triggering offset 305 may be a number of symbols or slots, and the number may be based on a UE processing time for decoding of the DCI 315. The triggering offset 305 may be the time between the triggering DCI 315 and the start of aperiodic CSI resources 310 (e.g., an aperiodic CSI-RS resource associated with the aperiodic CSI report). In other cases, a slot offset may be added to an aperiodic CSI resource 310. For example, there may be a determined minimum number of slots (e.g., one slot) between the triggering DCI 315 and the start of aperiodic CSI resources 310. Thus, the UE 115 may decode the triggering DCI 315 without buffering one or more CSI measurement resources (e.g., aperiodic CSI resources 310). Once the UE 115 decodes the triggering DCI 315, the UE 115 may identify which aperiodic CSI resources 310 (e.g., CSI resource 310-*b*, or CSI resource 310-*c*, or both) are to be measured for the CSI report based on the information included in the triggering DCI 315. Thus, while the UE 115 may be configured with a set of aperiodic CSI resources 310 (e.g., across one or more BWPs 325), the UE 115 may identify that a subset of CSI resources 310 (e.g., CSI resource 310-*b* and/or CSI resources 310-*c*) are to be measured for a triggered aperiodic CSI report after the triggering offset 305, while the UE 115 may not buffer other configured CSI measurement resources within the triggering offset 305 (e.g., CSI resources 310-*a*). The UE 115 may then measure the CSI resource(s) 310 and report the CSI to the base station 105. The CSI report may include channel condition information based on the measurement of the CSI resources 310-*b* and 310-*c*, and the channel condition information may be used by the base station 105 for modifying one or more transmission parameters.

In some cases, the base station 105 may indicate a number of configured aperiodic CSI resources 310 for a CSI measurement based on a UE capability. For example, the UE may indicate a threshold number of CSI measurement resources (e.g., a maximum number of aperiodic CSI resources 310) supported by the UE. Indicating the number of configured aperiodic CSI resources 310 may reduce the buffering time for the UE 115. For example, if the UE 115 is configured with a maximum number of aperiodic CSI resources 310, the UE 115 may buffer fewer aperiodic CSI resources 310 (as compared to cases where a the maximum number of CSI measurement resources is not used). For instance, the UE may expect to buffer no more than the maximum number of CSI measurement resources, which may reduce total buffer time.

In some examples, the UE 115 may report a capability associated with buffering memory (e.g., a memory size). For example, the UE 115 may report its memory size in a capability report, which may be indicated in terms of a number of symbols corresponding to reception bandwidth (e.g., a maximum number of symbols). The base station 105 may calculate the buffering effort related to the number of symbols, and configure the UE 115 with CSI measurement resources according to the UE capability.

Figure 4A:
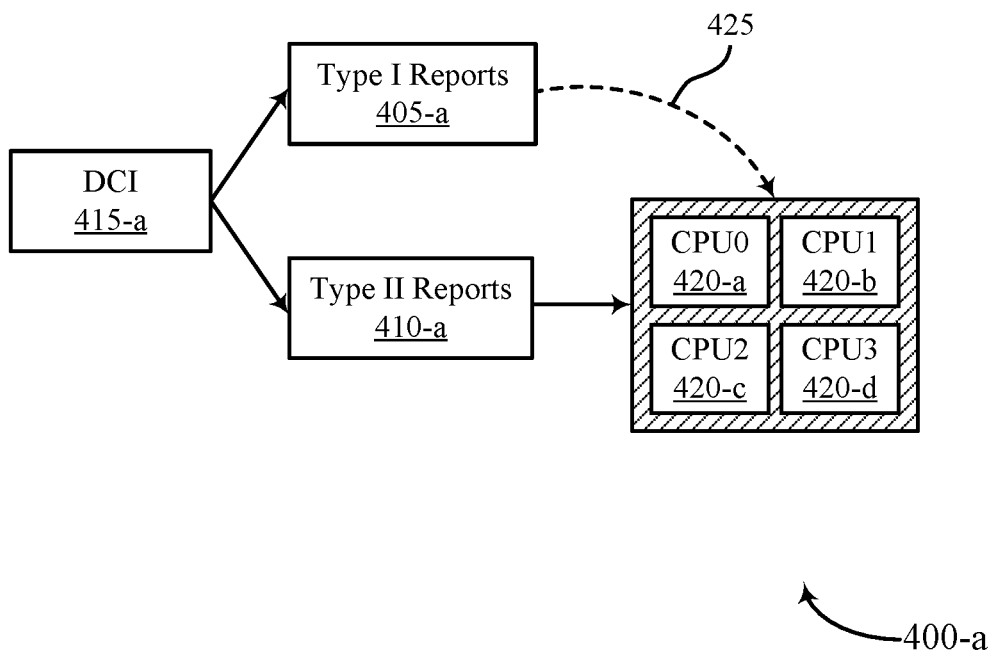
FIGS. 4A and 4B illustrate examples of processing diagrams that supports techniques for simplifying CSI feedback in accordance with aspects of the present disclosure.
Figure 4B:
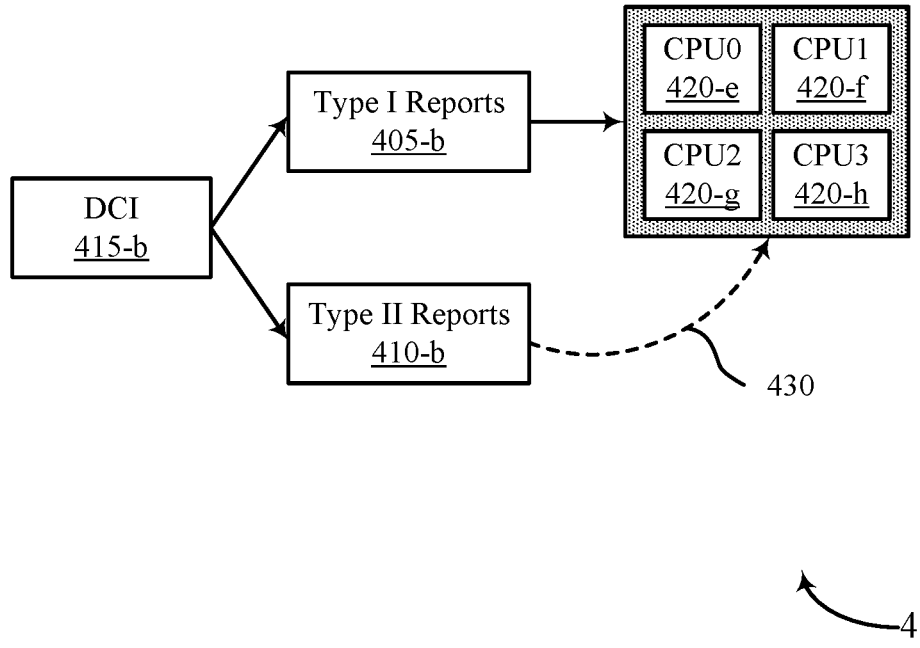

FIGS. 4A and 4B illustrate examples of processing diagrams 400-*a* and 400-*b* that support techniques for simplifying CSI feedback for wireless communications systems in accordance with aspects of the present disclosure. In some examples, processing diagrams 400-*a* and 400-*b* may implement aspects of wireless communications systems 100 and/or 200. For instance, processing diagrams 400-*a* and 400-*b* may each illustrate a process in which a UE 115 applies a codebook type to CSI feedback. Processing diagrams 400-*a* and 400-*b* include triggering DCI 415, which may be examples of triggering DCI 215 and 315 as described with reference to FIGS. 2 and 3, respectively.

In some cases, a UE 115 may receive a triggering DCI 415 from a base station 105. The triggering DCI 415 may trigger a Type I CSI report 405 or a Type II CSI report 410, which may be examples of Type I CSI reports and Type II CSI reports described with reference to FIG. 2. In some aspects the UE 115 may be configured with a larger CSI processing time (e.g., if the UE 115 is an NR light UE 115). For example, the values of $Z_2$ and $Z'_2$ associated with Type II CSI reporting may increase for low complexity UEs 115 (e.g., as compared to $Z_2$ and $Z'_2$ associated with Type I CSI reporting. Here, $Z_2$ and $Z'_2$ may refer to a time domain duration (e.g., from when the UE 115 is configured or triggered with the CSI report until when the UE 115 measures (e.g., $Z_2$) or reports the CSI resources (e.g., $Z'_2$).

In other cases, the UE 115 may not support concurrent Type II CSI report 410 and Type I CSI report 405 (e.g., Type I single panel, Type I multiple Panel, or other codebook Types). In such cases, Type I CSI report 405 and Type II CSI report 410 may be processed according to TDM techniques. As illustrated with respect to FIG. 4A, the UE 115 may receive triggering DCI 415-*a*, which may trigger at least a Type II CSI report 410. For instance, the triggering DCI 415-*a* may trigger a Type I CSI report 405-*a* and a Type II CSI report 410-*a*. In such cases, the UE 115 may identify which CSI report to process based on a number of CSI processing units (CPUs) 420 (e.g., CPUs 420-*a*, 420-*b*, 420-*c*, and 420-*d*) available to process each type of CSI. In such cases, As illustrated, the Type II CSI report 410-*a* may have a higher priority than the Type I CSI report 405-*a*, and the UE 115 may fill each of the CPUs 420 (e.g., CPUs 420-*a* through 420-*d*) when updating the Type II CSI report 410-*a*. Once CPUs 420-*a*, 420-*b*, 420-*c*, and 420-*d* are full, the UE 115 may not update Type I reports to the CPUs 420, as shown at 425, as no more CPUs are available.

In another example, with reference to FIG. 4B, the Type I CSI report 405-*b* may have a higher priority than the Type II CSI report 410-*b*, and a portion (e.g., a subset) of the CPUs 420 may be occupied by Type I CSI reports 405. As an illustrative example, when the Type I CSI report 405-*b* is generated, the Type I CSI report 405-*b* may occupy CPU 420-*e* and CPU 420-*f* (but not CPU 420-*g* and/or CPU 420-*h*). In such cases, the UE 115 may not update the Type II CSI report 410-*b* (e.g., shown at 430) if the Type I CSI report 405-*b* is triggered concurrently with the Type II CSI report 410-*b*, as there may not be enough CPUs 420 available to concurrently update the Type II CSI report 410-*b* (e.g., because, in an example, a Type II CSI report may utilize four CPUs, and two of the four CPUs are being utilized for generating the Type I CSI report). In such cases, the Type II CSI report 410-*b* may not be concurrently updated due to an insufficient number of CPUs being available, and may be updated at a later time (e.g., according to TDM processing techniques) or updating of Type II CSI report 410-*b* may be skipped.

In some examples, the rank for Type II CSI report 410 may be limited (e.g., to a value of 1) regardless of the number of receive antennas used and the rank for other codebook types. Accordingly, an RI may not be reported for Type II CSI report 410, thereby reducing the complexity of the Type II CSI report 410. An RI for Type I CSI report 405 may be based on a configured maximum MIMO layer. In other examples, the Type II CSI report 410 may be restricted for aperiodic CSI reporting using aperiodic CSI resources (e.g., aperiodic CSI-RS resources). For example, the UE 115 may not support Type II CSI report 410 for periodic or semi-persistent CSI resources (e.g., so the UE may not calculate Type II CSI report 410 for any periodic or semi-persistent CSI resources, in case some aperiodic CSI reports are triggered).

In some cases, the UE 115 may report concurrent codebook capabilities for Type I CSI report 405 and Type II CSI report 410. For example, CSI measurement resources for both Type I CSI report 405 and Type II CSI report 410 may be measured and calculated at the UE 115. The UE 115 may report the codebook capabilities separately (e.g., irrespective of whether the UE is configured with Type I CSI report 405, Type II CSI report 410, or mixed Type CSI). For example, the UE 115 may report different lists (supportedCSI-RS-ResourceLists) for Type II CSI reporting, Type I CSI reporting, concurrent Type I and Type II CSI reporting, or a combination thereof. In other cases, for Type II CSI report 410, the UE 115 may support wide-band CSI reporting (e.g., no support of sub-band Type II CSI reporting).

Figure 5:
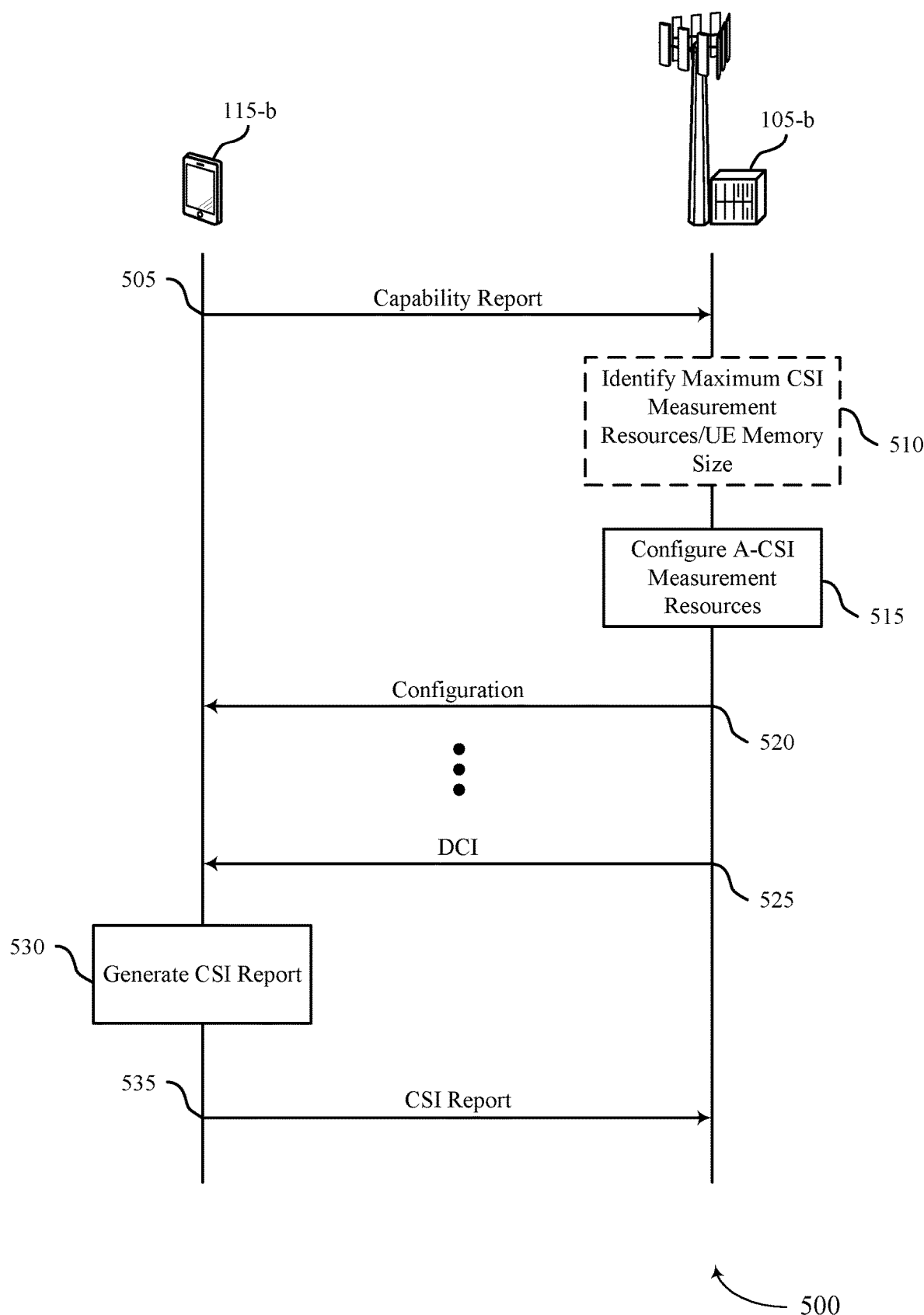
FIGS. 5 through 7 illustrate examples of process flows in a system that supports techniques for simplifying CSI feedback in accordance with aspects of the present disclosure.

FIG. 5 illustrates an example of a process flow 500 in a system that supports techniques for simplifying CSI feedback in accordance with aspects of the present disclosure. In some examples, process flow 500 may implement aspects of wireless communications systems 100 and 200. For example, process flow 500 includes UE 115-*b* and base station 105-*b*, which may be examples of the corresponding devices described with reference to FIGS. 1 and 2. In some cases, UE 115-*b* may be a UE 115 having reduced capabilities (e.g., a reduced number of antennas, reduced computational complexity, reduced operational bandwidth, or the like) as compared to other UEs 115. Process flow 500 may illustrate various techniques that relax buffering requirements of a UE 115, thereby enhancing CSI feedback processes performed by the UE 115.

At 505, UE 115-*b* may transmit, and base station 105-*b* may receive, a capability report indicating an aperiodic CSI measurement resource triggering offset supported by UE 115-*b*. For instance, the CSI measurement resource triggering offset may be a non-zero time between when a DCI is received (e.g., a DCI triggering an aperiodic CSI report) and when a first CSI measurement resource is received. In some cases, UE 115-*b* may include, in the capability report, an indication of a minimum amount of time (e.g., a number of symbol periods) corresponding to the CSI measurement resource triggering offset. In some cases, the CSI measurement resource triggering offset supported by UE 115-*b* may be based on the processing time for DCI decoding by UE 115-*b*. In other cases, the CSI measurement resource triggering offset may represent a slot time offset that is added to aperiodic CSI reporting processes, where a number of slot time intervals (e.g., one or two slots) may be added between the receipt of a triggering DCI and aperiodic CSI measurement resources (e.g., CSI-RSs). In some cases, the capability report may be a per-band codebook capability of UE 115-*b*.

Additionally or alternatively, UE 115-*b* may transmit, within the capability report, a threshold (e.g., a maximum) number of aperiodic CSI measurement resources associated with the CSI report that UE 115-*b* is capable of measuring. In such cases, the maximum number of aperiodic CSI measurement resources may be based on a number components UE 115-*b* is configured with for processing CSI, or may be related to other capabilities of UE 115-*b*. In other examples, UE 115-*b* may include an indication of a buffering memory size, or other like capabilities of the UE, in the capability report.

At 510, base station 105-*b* may identify, based on the received capability report, a threshold number of aperiodic CSI measurement resources, a UE memory size associated with buffering aperiodic CSI measurement resources, of a combination thereof.

At 515, base station 105-*b* may configure aperiodic CSI measurement resources for CSI measurements to be performed by UE 115-*b*. For example, the configuration may be based on the aperiodic CSI measurement resource triggering offset, where one or more CSI measurement resources may not be configured for transmission until after the aperiodic CSI measurement resource triggering offset (e.g., beginning when a triggering DCI is sent). Here, UE 115-*b* may not expect to be measure aperiodic CSI measurement resources until after the aperiodic CSI measurement resource triggering offset. More generally, base station 105-*b* may configure the aperiodic CSI resources based on the information included in the capability report. For example, base station 105-*b* may configure the one or more aperiodic CSI measurement resources based on the buffering memory size, the minimum aperiodic CSI measurement resources, the DCI decoding time supported by UE 115-*b*, the maximum number of CSI resources supported by UE 115-*b*, and so forth.

At 520, base station 105-*b* may transmit, and UE 115-*b* may receive, a configuration of one or more aperiodic CSI measurement resources. At 525, base station 105-*b* may transmit, and UE 115-*b* may receive, DCI triggering a CSI report for a first subset of aperiodic CSI measurement resources of the one or more aperiodic CSI measurement resources. The DCI may be based on the configuration of the one or more aperiodic CSI measurement resources and the aperiodic CSI measurement resource triggering offset.

At 530, UE 115-*b* may generate the CSI report based on the received configuration of the one or more CSI measurement resources. For instance, UE 115-*b* may identify the first subset of CSI-RS resources, and perform measurements of the CSI-RS resources to obtain various information for the CSI report.

At 535, UE 115-*b* may transmit, and base station 115-*b* may receive, the CSI report indicating a measurement of the first subset of aperiodic CSI measurement resources.

Figure 6:
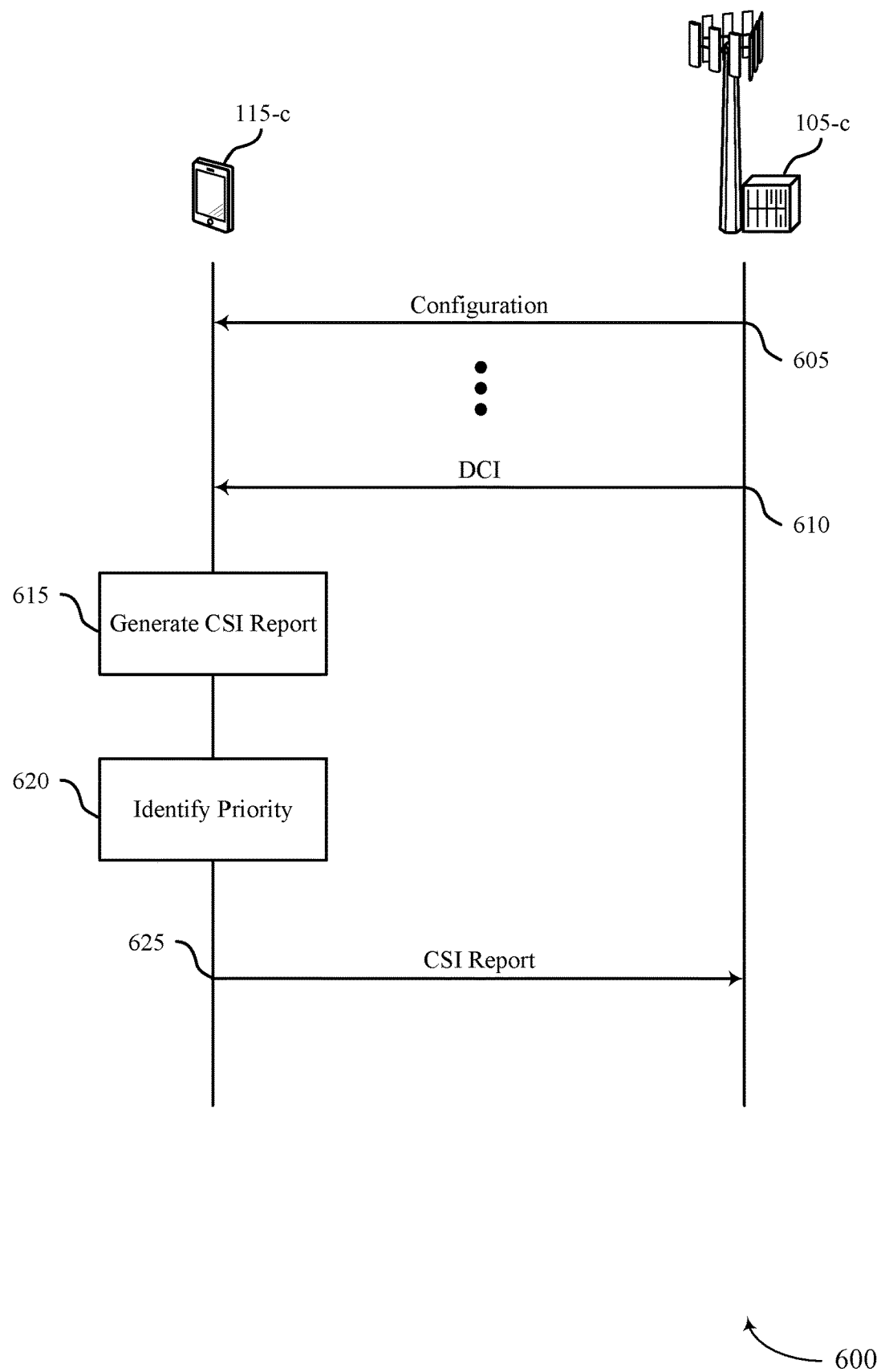

FIG. 6 illustrates an example of a process flow 600 in a system that supports techniques for simplifying CSI feedback in accordance with aspects of the present disclosure. In some examples, process flow 600 may implement aspects of wireless communications systems 100 and 200. For instance, process flow 600 includes base station 105-c and UE 115-c, each of which may be examples of the corresponding devices described with reference to FIGS. 1, 2, and 5. It is noted that UE 115-c and base station 105-c may perform aspects of the functions described with reference to process flow 500 and/or process flow 700, as described herein. Thus, although omitted from FIG. 6 for the sake of brevity, additional or alternative functions than those shown in process flow 600 may be performed by UE 115-c and base station 105-c, such as transmitting a capability report, configuring CSI-RS resources based on UE capabilities, or the like. Process flow 600 may illustrate an example of techniques that relax the processing time of CSI reporting (e.g., Type II CSI reporting) by UE 115-c while maintaining the performance of such reporting (e.g., for mitigating interference between UEs 115).

At 605, base station 105-c may transmit, and UE 115-c may receive, a configuration of one or more aperiodic CSI measurement resources (e.g., including CSI-RS). At 610, base station 105-c may transmit, and UE 115-c may receive, DCI that triggers a first CSI report associated with a first type of codebook (e.g., a Type II CSI report) and a second CSI report associated with a second type of codebook (e.g., a Type II CSI report).

At 615, UE 115-c may generate, based on the first type of codebook and the second type of codebook, one of the first CSI report or the second CSI report using a set of one or more CSI processing units. In such cases, the first CSI report may be processed using each CSI processing unit of the set of one or more CSI processing units based on the first type of codebook. Further, the second CSI report may be processed using a subset of CSI processing units of the set of one or more CSI processing units based on the second type of codebook. Stated another way, a Type II CSI report may occupy all CSI processing units of UE 115-c, whereas a Type I CSI report may occupy fewer than all CSI processing units of UE 115-c. In such cases, UE 115-c may determine to not update one CSI report or another based on identifying the type of codebook.

At 620, UE 115-c may identify a priority of the first and second CSI reports. As an example, UE 115-c may first consider a codebook type before checking a CSI priority rule for updating and processing CSI. In such cases, UE 115-c may identify that the first CSI report (e.g., the Type II CSI report) has priority over the second CSI report (e.g., the Type I CSI report). UE 115-c may then refrain from updating the second CSI report based on using each CSI processing unit of the set of one or more CSI processing units for generating the first CSI report. That is, because all of the CSI processing units of UE 115-c may be occupied by the Type II CSI report, UE 115-c may not update the Type I CSI report, for example, until a later time when the CSI processing units are unoccupied or available.

Alternatively, UE 115-c may identify that the second CSI report has a higher priority than the first CSI report, and UE 115-c may refrain from updating the first CSI report based on using the subset of CSI processing units of the set of one or more CSI processing units for generating the second CSI report. Because some of the CSI processing units of UE 115-c may be occupied for processing the Type I CSI report, there may not be enough CSI processing units available for processing the Type II CSI report (e.g., until a later time). As such, UE 115-c may determine to not update the Type II CSI report.

At 625, UE 115-c may transmit, and base station 105-c may receive, the generated CSI report.

Figure 7:
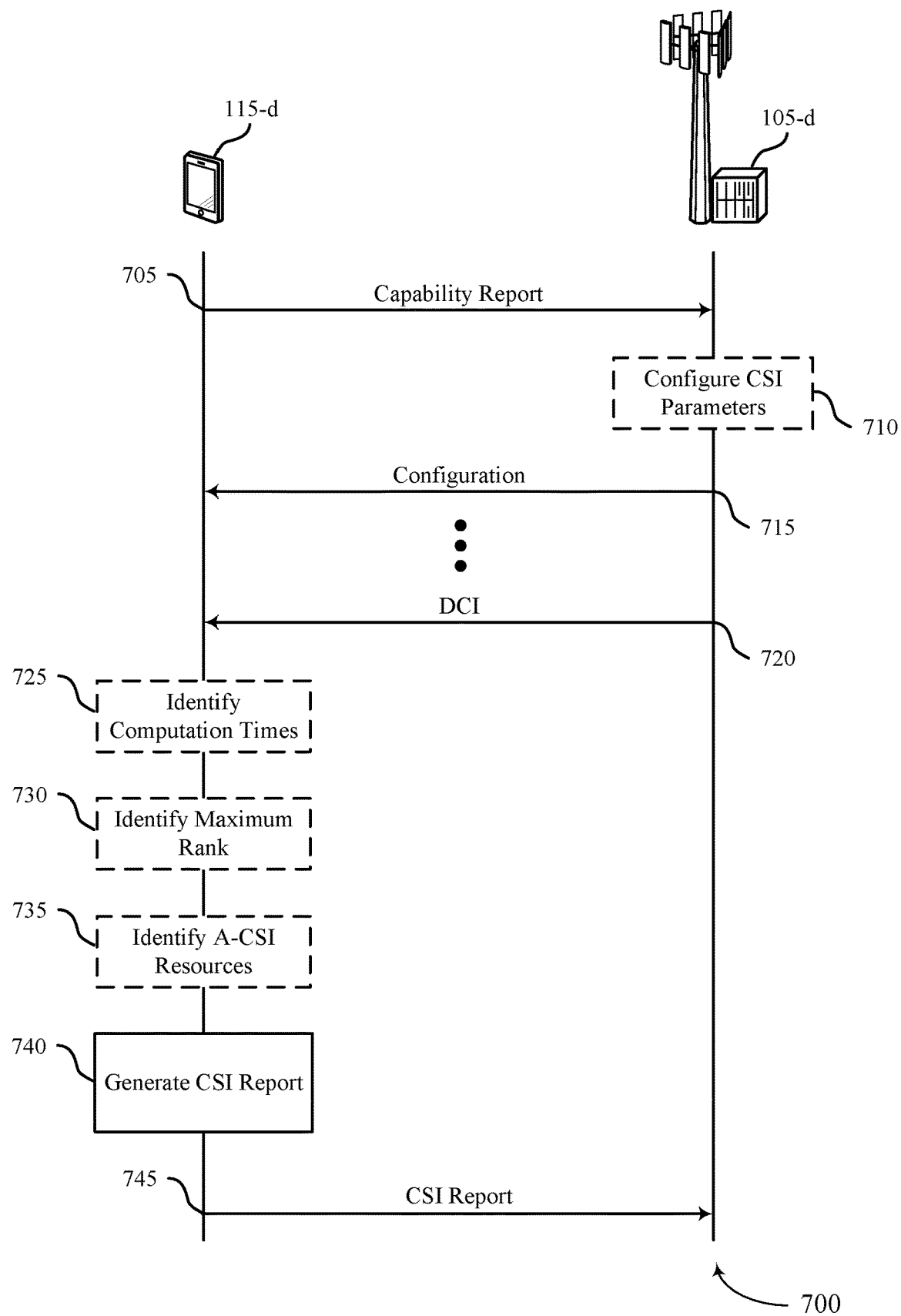

FIG. 7 illustrates an example of a process flow 700 in a system that supports techniques for simplifying CSI feedback in accordance with aspects of the present disclosure. In some examples, process flow 700 may implement aspects of wireless communications systems 100 and 200. For instance, process flow 700 includes base station 105-d and UE 115-d, each of which may be examples of the corresponding devices described with reference to FIGS. 1, 2, and 5. It is noted that UE 115-d and base station 105-d may perform aspects of the functions described with reference to process flow 500 and/or process flow 600, as described herein. Thus, although omitted from process flow 700 for the sake of brevity, process flow 600 may include additional or alternative features than those shown, such as configuring CSI measurement resources, or the like. Process flow 700 may illustrate an example of techniques that relax the processing time of CSI reporting (e.g., Type II CSI reporting) by UE 115-d while maintaining the performance of such reporting (e.g., for mitigating interference between UEs 115).

At 705, UE 115-d may transmit, and base station 105-d may receive, a capability report indicating one or more capabilities of UE 115-d. As an example, UE 115-d may transmit a capability report including a first capability indication of a capability for concurrent generation of a first CSI report and a second CSI report, a second capability indication for generation of the first CSI report individually, a third capability indication for generation of the second CSI report individually, or a combination thereof.

In some cases, at 710, base station 105-d may configure different sets of parameters for respective CSI reports that use different types of codebooks. For example, base station 105-d may configure a first parameter set for a first CSI report associated with a first type of codebook (e.g., a Type II codebook) and a second parameter set for a second CSI report associated with a second type of codebook (e.g., a Type I single panel or a Type I multiple panel codebook). In some cases, the configuration of the first and second parameters sets may be based on the capability report received from UE 115-d. For instance, base station 105-d may configure a maximum rank value for Type II CSI reports, or base station 105-d may limit Type II CSI reporting to only aperiodic CSI resources. In another example, Type II CSI reporting may be configured to be limited to wideband reporting (and may not be configured for sub-band reporting).

In any case, at 715, base station 105-d may transmit, and UE 115-d may receive, a configuration of one or more aperiodic CSI measurement resources. The configuration may include an indication of the first parameter set and the second parameter set.

At 720, base station 105-d may transmit, and UE 115-d may receive, DCI triggering a first CSI report associated with a first type of codebook (e.g., a Type II CSI report), or a second CSI report associated with a second type of codebook (e.g., a Type I CSI report).

At 725, UE 115-d may optionally identify, from the first parameter set, a first set of CSI computation times (e.g., $Z_2$ and $Z'_2$ for Type II CSI, as described herein) associated with the first CSI report, the first set of CSI computation times being different from a second set of CSI computation times associated with the second CSI report. Further, UE 115-d may identify, from the second parameter set, the second set of CSI computation times associated with the second CSI report (e.g., $Z_2$ and $Z'_2$ for Type I CSI as described herein).

Here, the second set of CSI computation times may be different from (e.g., having a shorter duration than) the first set of CSI computation times associated with the Type II CSI report.

Additionally or alternatively, at 730, UE 115-*d* may identify a rank threshold value associated with the first CSI report based on the first parameter set. In other examples, at 735, UE 115-*d* may optionally identify identifying a first set of one or more aperiodic CSI measurement resources based on the first parameter set, the first set of one or more aperiodic CSI measurement resources being configured for aperiodic CSI reporting.

At 740, UE 115-*d* may generate the first CSI report using a first parameter set and the first type of codebook, or the second CSI report using a second parameter set and the second type of codebook, or a combination thereof. As described herein, the generated CSI report(s) may be based on the received DCI.

At 745, UE 115-*d* may the first CSI report (e.g., the Type II CSI report), or the second CSI report (e.g., the Type I CSI report), or both, to base station 105-*d*. In such cases, UE 115-*d* may transmit the first CSI report based on the first set of CSI computation times, or transmit the second channel station information report based on the second set of CSI computation times, or a combination thereof. In some cases, the first CSI report may be transmitted excluding a rank indicator based on the rank threshold value. In some examples, the first CSI report includes a wide band CSI report.

Figure 8:
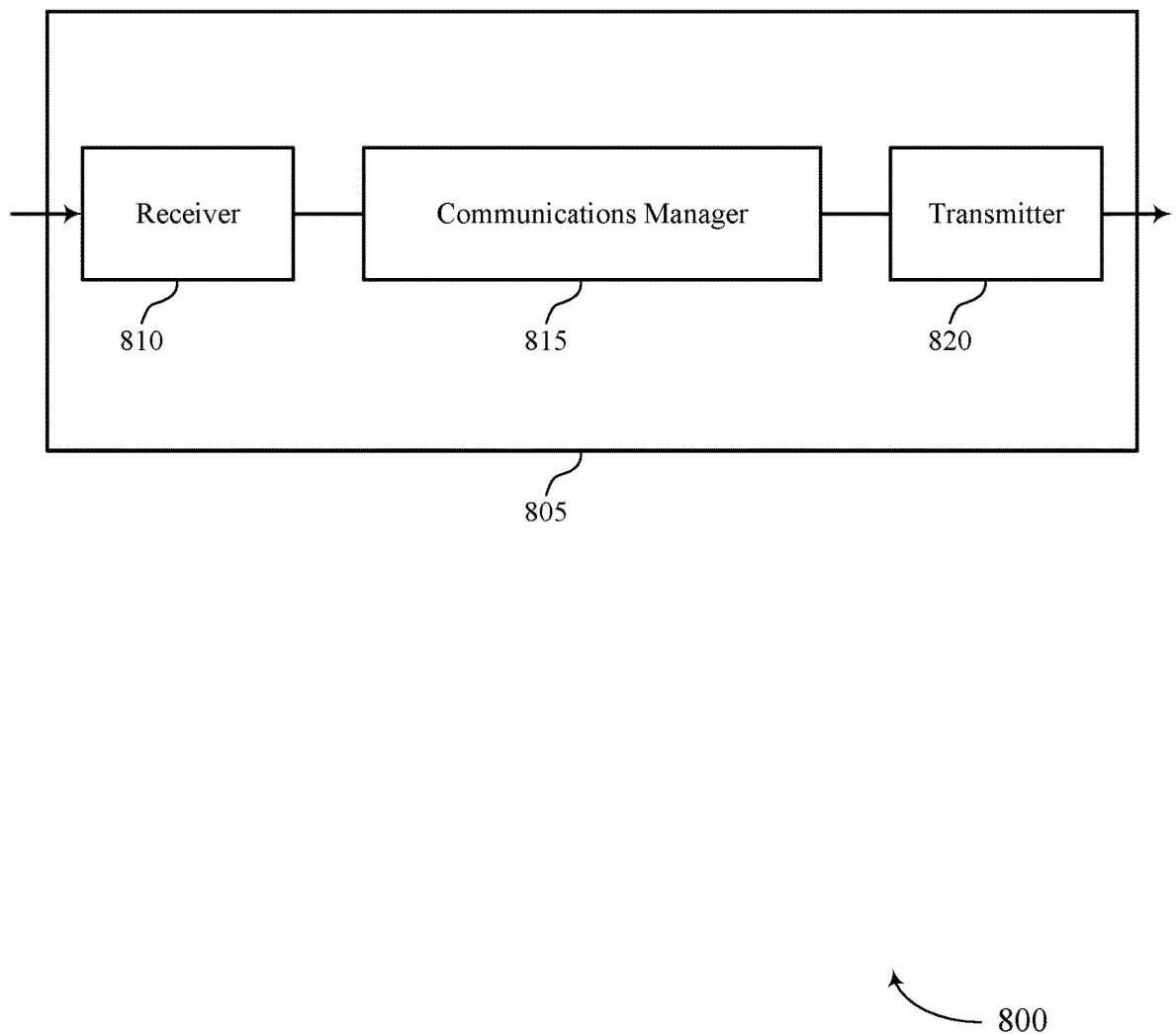
FIGS. 8 and 9 show diagrams of devices that support techniques for simplifying CSI feedback in accordance with aspects of the present disclosure.

FIG. 8 shows a diagram 800 of a device 805 that supports techniques for simplifying CSI feedback in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for simplifying CSI feedback, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit, to a base station, a capability report indicating an aperiodic CSI measurement resource triggering offset supported by the UE, receive a configuration of one or more aperiodic CSI measurement resources, receive DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset, and transmit, to the base station, a CSI report indicating a measurement of the first subset of aperiodic CSI measurement resources.

The communications manager 815 may also receive, from a base station, DCI that triggers a first CSI report associated with a first type of codebook and a second CSI report associated with a second type of codebook that differs from the first type of codebook, generate, based on the first type of codebook and the second type of codebook, one of the first CSI report or the second CSI report using a set of one or more CSI processing units, where the first CSI report is processed using each CSI processing unit of the set of one or more CSI processing units based on the first type of codebook, or where the second CSI report is processed using a subset of CSI processing units of the set of one or more CSI processing units based on the second type of codebook, or a combination thereof, and transmit the generated CSI report.

In some examples, the communications manager 815 may also receive DCI triggering a first CSI report associated with a first type of codebook, or a second CSI report associated with a second type of codebook that differs from the first type of codebook, or a combination thereof, generate the first CSI report using a first parameter set and the first type of codebook, or the second CSI report using a second parameter set and the second type of codebook, or a combination thereof, based on the received DCI, and transmit the first CSI report, or the second CSI report, or a combination thereof. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
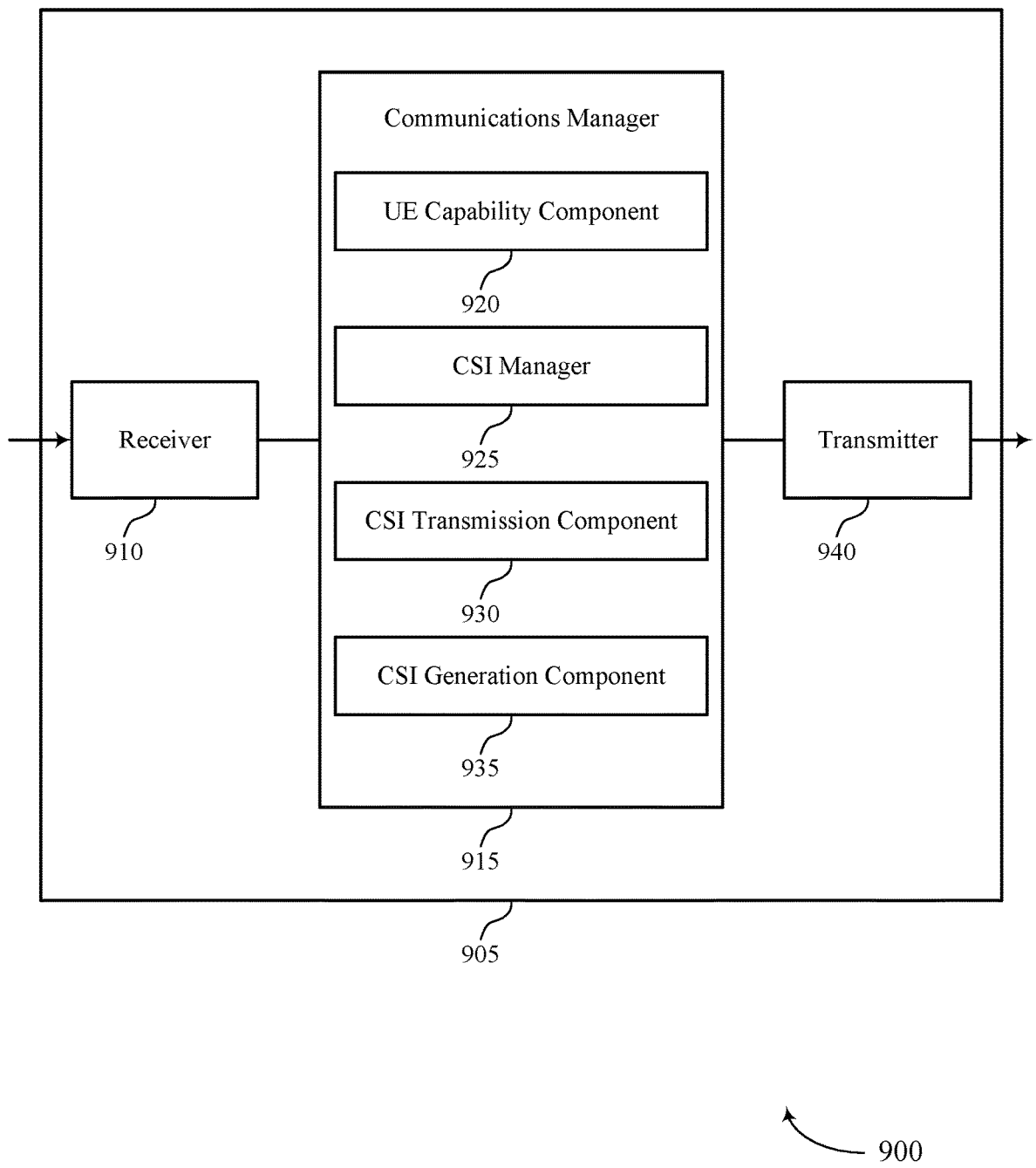

FIG. 9 shows a diagram 900 of a device 905 that supports techniques for simplifying CSI feedback in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to techniques for simplifying CSI feedback, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a UE capability component 920, a CSI manager 925, a CSI transmission component 930, and a CSI generation component 935. The communications manager 915 may be an example of aspects of the communications manager 1110 described herein.

The actions performed by the communications manager 915 as described herein may be implemented to realize one or more potential advantages. One implementation may enable a UE to report a capability to the base station. Such reporting may enable techniques for simplifying CSI feedback by using a triggering offset or modifying CSI reporting based on different codebook types, which may result in improved UE complexity and more efficient communications (e.g., decreased latency in the system), among other advantages.

Based on implementing the reporting as described herein, a processor of a UE or base station (e.g., a processor controlling the receiver 910, the communications manager 915, the transmitter 940, or a combination thereof) may reduce the complexity of a CSI feedback procedure while ensuring relatively efficient communications. For example, the reporting techniques described herein may leverage a time delay or CSI reporting codebook type during a slot format determination procedure, which may realize reduced signaling overhead and power savings, among other benefits.

The UE capability component 920 may transmit, to a base station, a capability report indicating an aperiodic CSI measurement resource triggering offset supported by the UE. The CSI manager 925 may receive a configuration of one or more aperiodic CSI measurement resources and receive DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset.

The CSI manager 925 may receive, from a base station, DCI that triggers a first CSI report associated with a first type of codebook (e.g., Type I CSI) and a second CSI report associated with a second type of codebook that differs from the first type of codebook (e.g., Type II CSI). In some examples, the CSI manager 925 may receive DCI triggering a first CSI report associated with a first type of codebook, or a second CSI report associated with a second type of codebook that differs from the first type of codebook, or a combination thereof.

The CSI transmission component 930 may transmit, to the base station, a CSI report indicating a measurement of the first subset of aperiodic CSI measurement resources. In some examples, the CSI transmission component 930 may transmit a generated CSI report. Additionally or alternatively, the CSI transmission component 930 may transmit the first CSI report, or the second CSI report, or a combination thereof.

The CSI generation component 935 may generate, based on the first type of codebook and the second type of codebook, one of the first CSI report or the second CSI report using a set of one or more CSI processing units, where the first CSI report is processed using each CSI processing unit of the set of one or more CSI processing units based on the first type of codebook, or where the second CSI report is processed using a subset of CSI processing units of the set of one or more CSI processing units based on the second type of codebook, or a combination thereof. In some cases, the CSI generation component 935 may generate the first CSI report using a first parameter set and the first type of codebook, or the second CSI report using a second parameter set and the second type of codebook, or a combination thereof, based on the received DCI.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
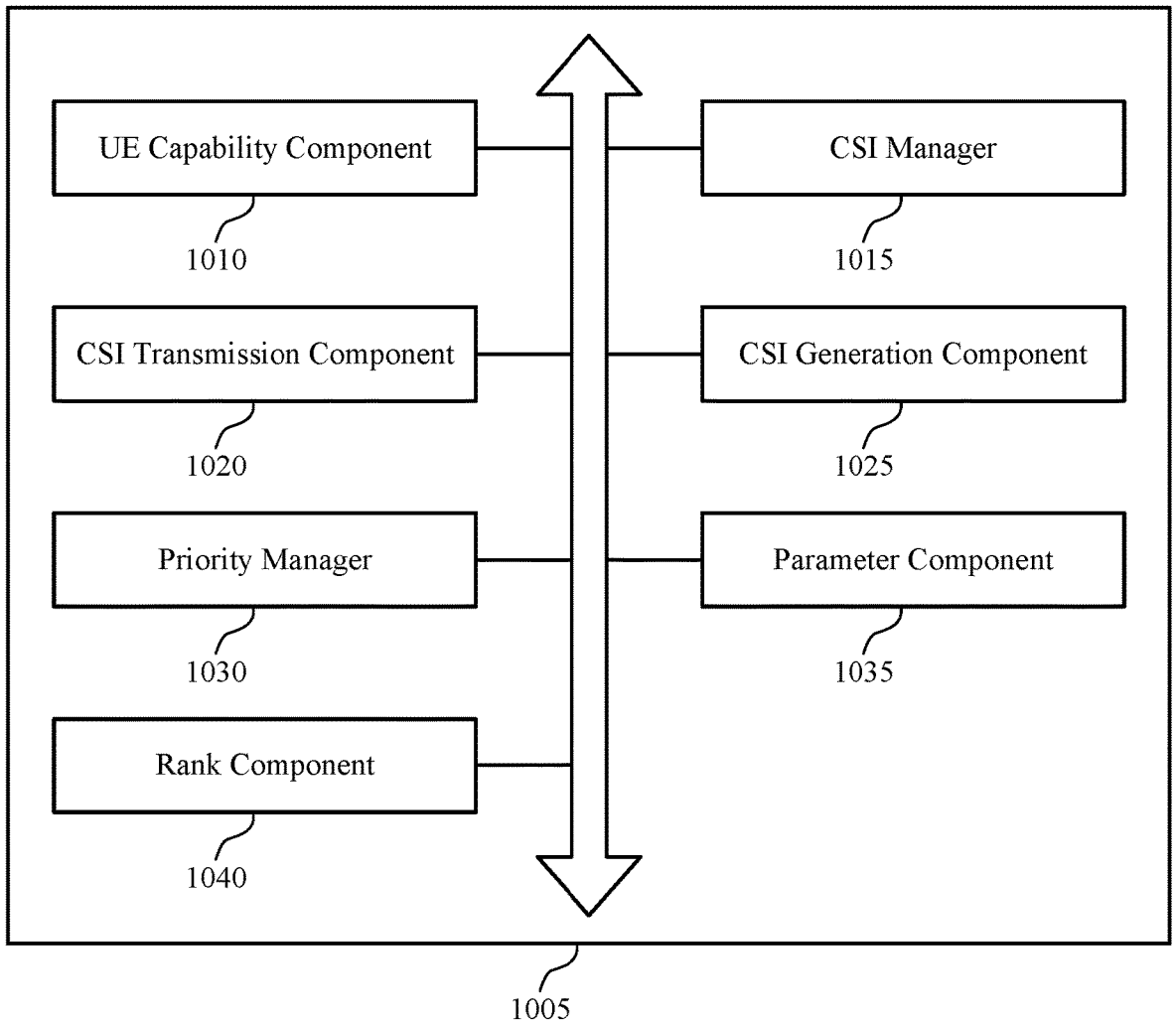
FIG. 10 shows a diagram of a communications manager that supports techniques for simplifying CSI feedback in accordance with aspects of the present disclosure.

FIG. 10 shows a diagram 1000 of a communications manager 1005 that supports techniques for simplifying CSI feedback in accordance with aspects of the present disclosure. The communications manager 1005 may be an example of aspects of a communications manager 815, a communications manager 915, or a communications manager 1110 described herein. The communications manager 1005 may include a UE capability component 1010, a CSI manager 1015, a CSI transmission component 1020, a CSI generation component 1025, a priority manager 1030, a parameter component 1035, and a rank component 1040. Each of these modules may communicate, directly or indirectly, with one another (e.g., via one or more buses).

The UE capability component 1010 may transmit, to a base station, a capability report indicating an aperiodic CSI measurement resource triggering offset supported by the UE. In some examples, the UE capability component 1010 may transmit the capability report indicating the aperiodic CSI measurement resource triggering offset that is a threshold duration after which the UE is capable of receiving the one or more aperiodic CSI measurement resources relative to receiving the DCI.

In some examples, the UE capability component 1010 may transmit the capability report indicating the aperiodic CSI measurement resource triggering offset that indicates a processing time supported by the UE for decoding the DCI. In some examples, the UE capability component 1010 may transmit the capability report indicating a threshold number of aperiodic CSI measurement resources associated with the CSI report that the UE is capable of measuring, where the CSI report includes a measurement for at least one of the one or more aperiodic CSI measurement resources up to the threshold number of aperiodic CSI measurement resources.

In some examples, the UE capability component 1010 may transmit the capability report including an indication of a buffering memory size, where the configuration of the one or more aperiodic CSI measurement resources is based on the buffering memory size. In some examples, the UE capability component 1010 may transmit a capability report including a first capability indication of the UE capability for concurrent generation of the first CSI report and the second CSI report, a second capability indication for generation of the first CSI report individually, a third capability indication for generation of the second CSI report individually, or a combination thereof. In some cases, the aperiodic CSI measurement resource triggering offset indicates one or more symbol periods, one or more slot durations, or a combination thereof. In some cases, the threshold number of aperiodic CSI measurement resources indicates a maximum number of aperiodic CSI measurement resources associated with the CSI report that the UE is capable of measuring. In some cases, the CSI report includes an aperiodic CSI report.

The CSI manager 1015 may receive a configuration of one or more aperiodic CSI measurement resources. In some examples, the CSI manager 1015 may receive DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset. In some examples, the CSI manager 1015 may receive, from a base station, DCI that triggers a first CSI report associated with a first type of codebook and a second CSI report associated with a second type of codebook that differs from the first type of codebook.

Additionally or alternatively, the CSI manager 1015 may receive DCI triggering a first CSI report associated with a first type of codebook, or a second CSI report associated with a second type of codebook that differs from the first type of codebook, or a combination thereof. In some examples, the CSI manager 1015 may refrain from updating the second CSI report based on using each CSI processing unit of the set of one or more CSI processing units for generating the first CSI report, where transmitting the generated CSI report includes transmitting the first CSI report.

In some examples, the CSI manager 1015 may refrain from updating the first CSI report based on using the subset of CSI processing units of the set of one or more CSI processing units for generating the second CSI report, where transmitting the generated CSI report includes transmitting the second CSI report. In some examples, the CSI manager 1015 may identify a first set of one or more aperiodic CSI measurement resources based on the first parameter set, the first set of one or more aperiodic CSI measurement resources being configured for aperiodic CSI reporting. In some cases, the first type of codebook includes a Type II CSI codebook. In some cases, the first CSI report includes a wide band CSI report.

The CSI transmission component 1020 may transmit, to the base station, a CSI report indicating a measurement of the first subset of aperiodic CSI measurement resources. In some examples, the CSI transmission component 1020 may transmit a generated CSI report. Additionally or alternatively, the CSI transmission component 1020 may transmit the first CSI report, or the second CSI report, or a combination thereof. In some examples, the CSI transmission component 1020 may transmit the first CSI report that is generated based on measurement of the one or more aperiodic CSI measurement resources.

In some examples, the CSI transmission component 1020 may transmit the first CSI report based on the first set of CSI computation times. In some examples, the CSI transmission component 1020 may transmit the second CSI report based at least in part on the second set of CSI computation times. In some cases, the CSI transmission component 1020 may transmit the first CSI report excluding a rank indicator based on the rank threshold value.

The CSI generation component 1025 may generate, based on the first type of codebook and the second type of codebook, one of the first CSI report or the second CSI report using a set of one or more CSI processing units, where the first CSI report is processed using each CSI processing unit of the set of one or more CSI processing units based on the first type of codebook, or where the second CSI report is processed using a subset of CSI processing units of the set of one or more CSI processing units based on the second type of codebook, or a combination thereof.

In some examples, the CSI generation component 1025 may generate the first CSI report using a first parameter set and the first type of codebook, or the second CSI report using a second parameter set and the second type of codebook, or a combination thereof, based on the received DCI.

The priority manager 1030 may identify that the first CSI report has priority over the second CSI report. In some examples, the priority manager 1030 may identify that the second CSI report has a higher priority than the first CSI report.

The parameter component 1035 may identify, from the first parameter set, a first set of CSI computation times associated with the first CSI report, the first set of CSI computation times being different from a second set of CSI computation times associated with the second CSI report. In some examples, the parameter component 1035 may identify, from the second parameter set, the second set of CSI computation times associated with the second CSI report, the second set of CSI computation times being different from the first set of CSI computation times associated with the first CSI report.

In some examples, the parameter component 1035 may receive, from a base station, an indication of the first parameter set and the second parameter set. In some cases, at least a portion of the first parameter set is different from the second parameter set. The rank component 1040 may identify a rank threshold value associated with the first CSI report based on the first parameter set.

Figure 11:
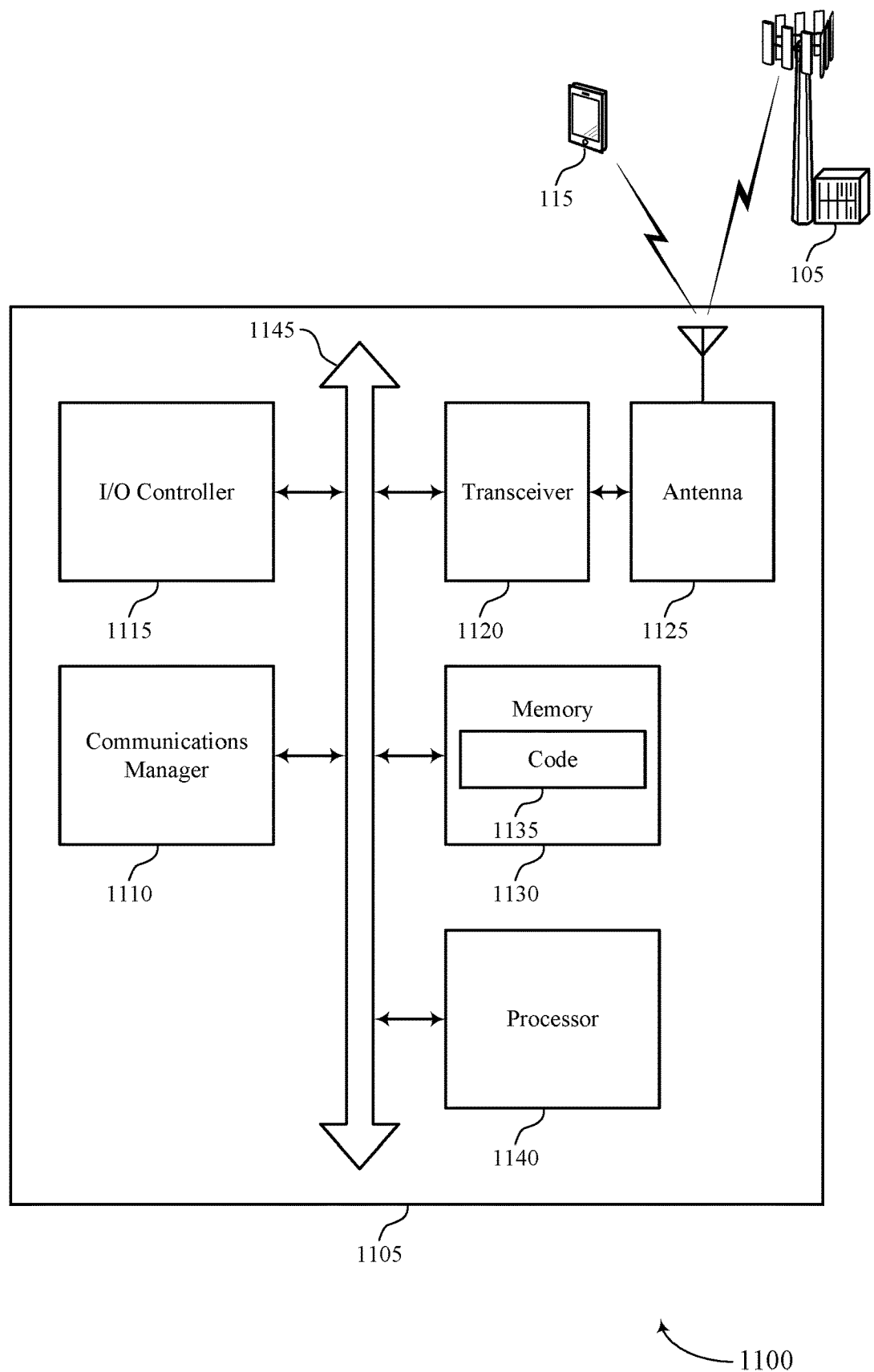
FIG. 11 shows a diagram of a system including a device that supports techniques for simplifying CSI feedback in accordance with aspects of the present disclosure.

FIG. 11 shows a diagram of a system 1100 including a device 1105 that supports techniques for simplifying CSI feedback in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may transmit, to a base station, a capability report indicating an aperiodic CSI measurement resource triggering offset supported by the UE, receive a configuration of one or more aperiodic CSI measurement resources, receive DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset, and transmit, to the base station, a CSI report indicating a measurement of the first subset of aperiodic CSI measurement resources.

The communications manager 1110 may also receive, from a base station, DCI that triggers a first CSI report associated with a first type of codebook and a second CSI report associated with a second type of codebook that differs from the first type of codebook, generate, based on the first type of codebook (e.g., a Type I codebook) and the second type of codebook (e.g., a Type II codebook), one of the first CSI report or the second CSI report using a set of one or more CSI processing units, where the first CSI report is processed using each CSI processing unit of the set of one or more CSI processing units based on the first type of codebook, or where the second CSI report is processed using a subset of CSI processing units of the set of one or more CSI processing units based on the second type of codebook, or a combination thereof, and transmit the generated CSI report.

In some examples, the communications manager 1110 may also receive DCI triggering a first CSI report associated with a first type of codebook, or a second CSI report associated with a second type of codebook that differs from the first type of codebook, or a combination thereof, generate the first CSI report using a first parameter set and the first type of codebook, or the second CSI report using a second parameter set and the second type of codebook, or a combination thereof, based on the received DCI, and transmit the first CSI report, or the second CSI report, or a combination thereof.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for simplifying CSI feedback).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
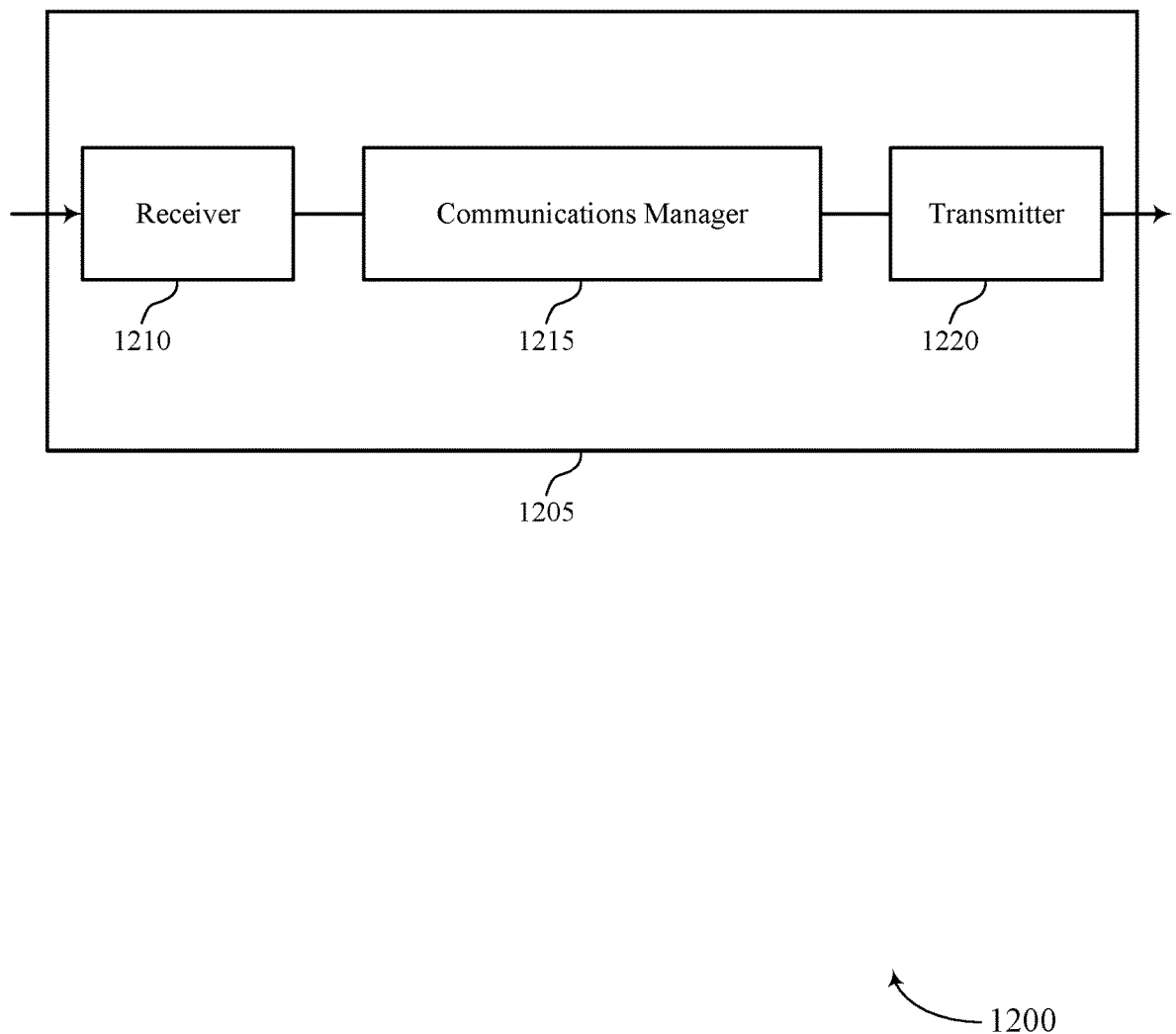
FIGS. 12 and 13 show diagrams of devices that support techniques for simplifying CSI feedback in accordance with aspects of the present disclosure.

FIG. 12 shows a diagram 1200 of a device 1205 that supports techniques for simplifying CSI feedback in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for simplifying CSI feedback, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive, from a UE, a capability report including an indication of CSI reporting capability supported by the UE, identify, based on the received capability report, a threshold number of aperiodic CSI measurement resources, a UE memory size associated with buffering aperiodic CSI measurement resources, or a combination thereof, transmit a configuration of one or more aperiodic CSI measurement resources for CSI reporting by the UE, the configuration being based on the threshold number of aperiodic CSI measurement resources, or the UE memory size, or a combination thereof, and transmit, to the UE, DCI triggering the CSI reporting for a subset of aperiodic CSI measurement resources of the one or more aperiodic CSI measurement resources.

The communications manager 1215 may also configure a first parameter set for a first CSI report associated with a first type of codebook and a second parameter set for a second CSI report associated with a second type of codebook that differs from the first type of codebook, transmit, to a UE, DCI triggering the first CSI report, or the second CSI report, or a combination thereof, and receive, from the UE, the first CSI report, or the second CSI report, or a combination thereof, based on the received DCI, where the first CSI report is based on the first parameter set, the second CSI report is based on the second parameter set, or a combination thereof. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
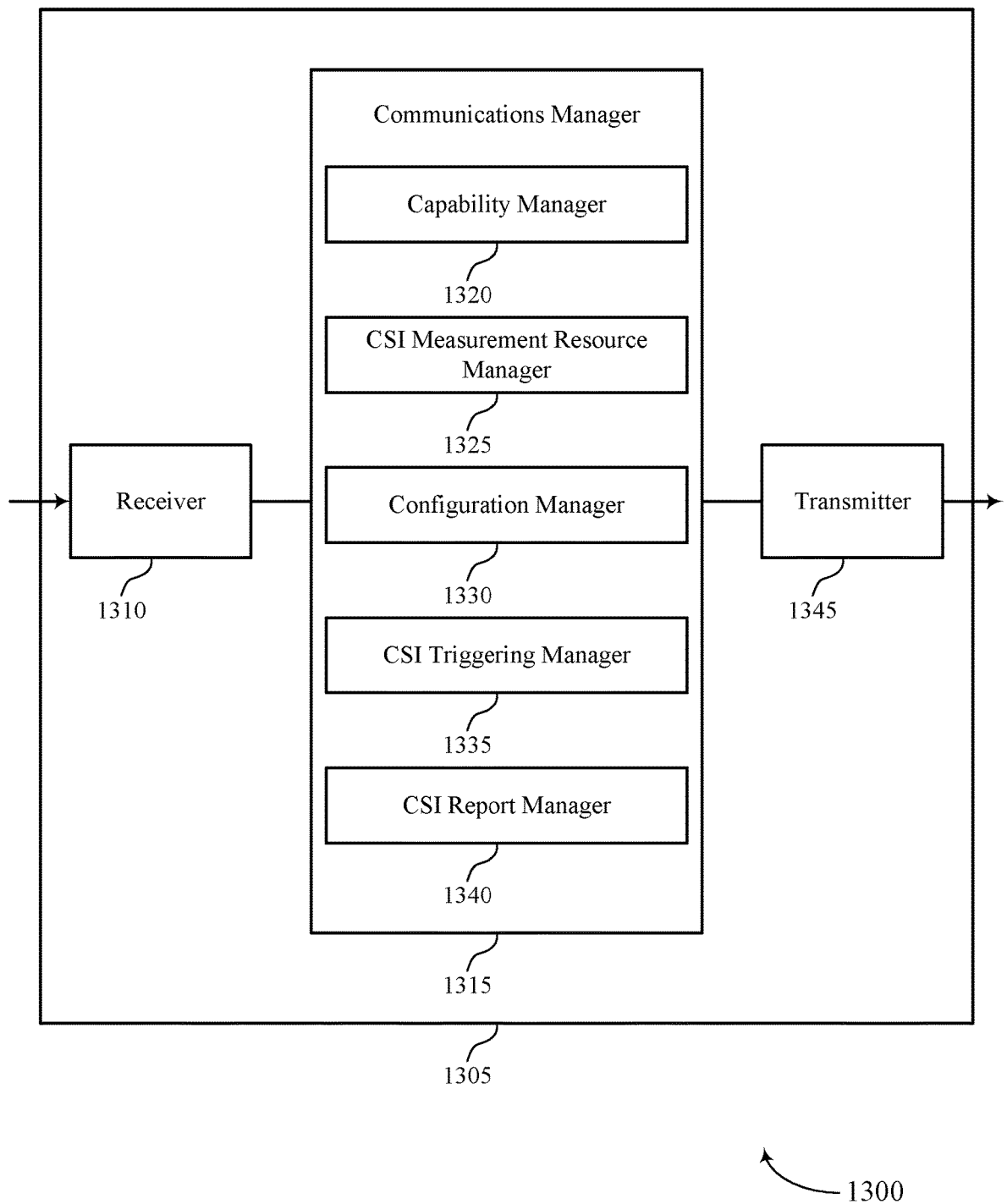

FIG. 13 shows a diagram 1300 of a device 1305 that supports techniques for simplifying CSI feedback in accordance with aspects of the present disclosure. The device 1305 may be an example of aspects of a device 1205, or a base station 105 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for simplifying CSI feedback, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a capability manager 1320, a CSI measurement resource manager 1325, a configuration manager 1330, a CSI triggering manager 1335, and a CSI report manager 1340. The communications manager 1315 may be an example of aspects of the communications manager 1510 described herein.

The capability manager 1320 may receive, from a UE, a capability report including an indication of CSI reporting capability supported by the UE. The CSI measurement resource manager 1325 may identify, based on the received capability report, a threshold number of aperiodic CSI measurement resources, a UE memory size associated with buffering aperiodic CSI measurement resources, or a combination thereof.

The configuration manager 1330 may transmit a configuration of one or more aperiodic CSI measurement resources for CSI reporting by the UE, the configuration being based on the threshold number of aperiodic CSI measurement resources, or the UE memory size, or a combination thereof. The configuration manager 1330 may configure a first parameter set for a first CSI report associated with a first type of codebook and a second parameter set for a second CSI report associated with a second type of codebook that differs from the first type of codebook.

The CSI triggering manager 1335 may transmit, to the UE, DCI triggering the CSI reporting for a subset of aperiodic CSI measurement resources of the one or more aperiodic CSI measurement resources. Additionally or alternatively, the CSI triggering manager 1335 may transmit, to the UE, DCI triggering the first CSI report, or the second CSI report, or a combination thereof.

The CSI report manager 1340 may receive, from the UE, the first CSI report, or the second CSI report, or a combination thereof, based on the received DCI, where the first CSI report is based on the first parameter set, the second CSI report is based on the second parameter set, or a combination thereof.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
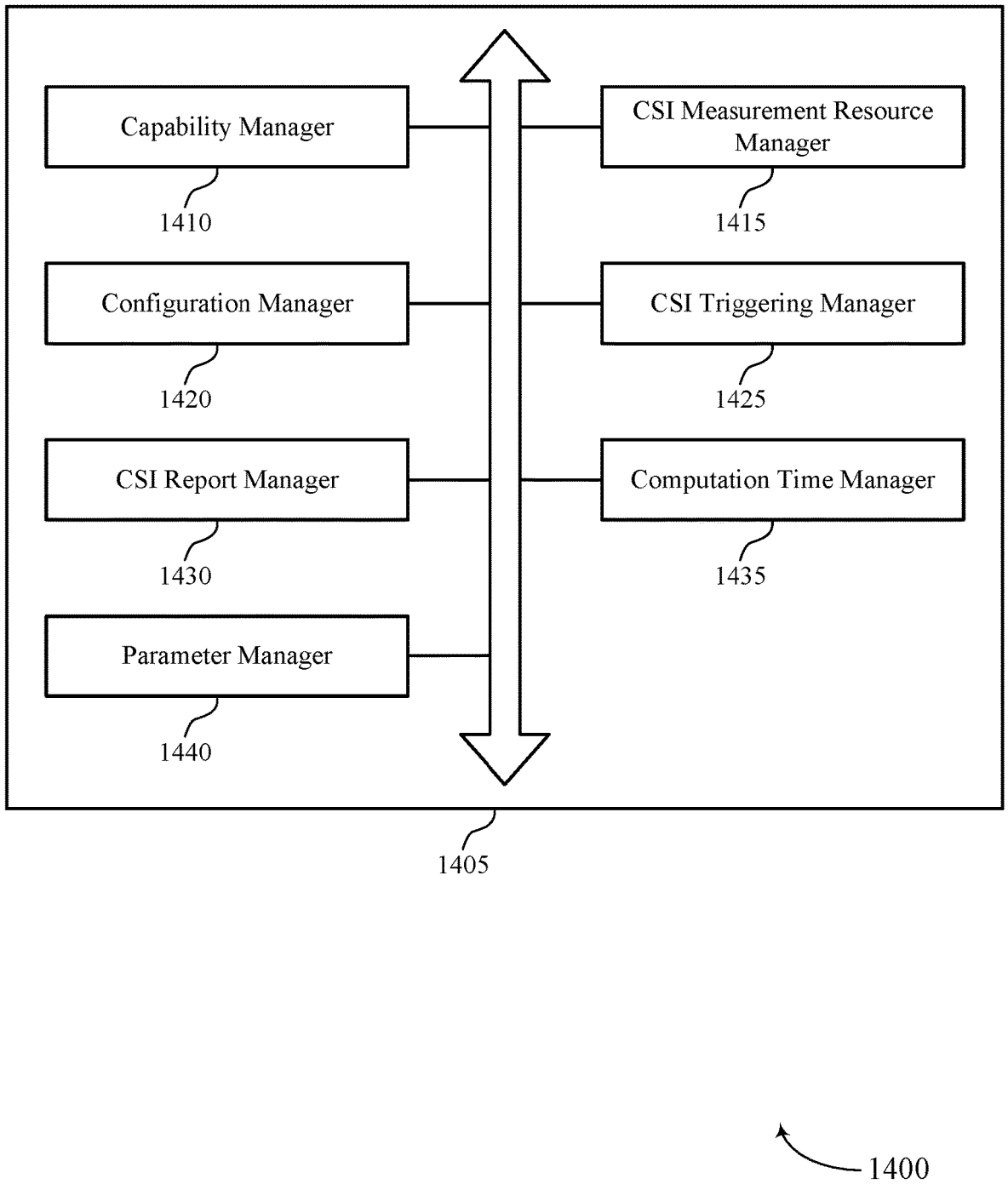
FIG. 14 shows a diagram of a communications manager that supports techniques for simplifying CSI feedback in accordance with aspects of the present disclosure.

FIG. 14 shows a diagram 1400 of a communications manager 1405 that supports techniques for simplifying CSI feedback in accordance with aspects of the present disclosure. The communications manager 1405 may be an example of aspects of a communications manager 1215, a communications manager 1315, or a communications manager 1510 described herein. The communications manager 1405 may include a capability manager 1410, a CSI measurement resource manager 1415, a configuration manager 1420, a CSI triggering manager 1425, a CSI report manager 1430, a computation time manager 1435, and a parameter manager 1440. Each of these modules may communicate, directly or indirectly, with one another (e.g., via one or more buses).

The capability manager 1410 may receive, from a UE, a capability report including an indication of CSI reporting capability supported by the UE. In some examples, the capability manager 1410 may receive a capability report from the UE. In some examples, the capability manager 1410 may identify, from the capability report, a first capability indication for concurrent generation of the first CSI report and the second CSI report, a second capability indication for generation of the first CSI report individually, a third capability indication for generation of the second CSI report individually, or a combination thereof. In some cases, the received capability report includes an indication of the UE memory size, where the UE memory size indicates one or more symbol periods of a reception bandwidth for receiving the one or more aperiodic CSI measurement resources.

The CSI measurement resource manager 1415 may identify, based on the received capability report, a threshold number of aperiodic CSI measurement resources, a UE memory size associated with buffering aperiodic CSI measurement resources, or a combination thereof. In some examples, the CSI measurement resource manager 1415 may configure a first set of one or more aperiodic CSI measurement resources based on the first parameter set, the first set of one or more aperiodic CSI measurement resources being configured for aperiodic CSI reporting. In some cases, the threshold number of aperiodic CSI measurement resources indicates a maximum number of aperiodic CSI measurement resources associated with the CSI reporting that the UE is capable of measuring.

The configuration manager 1420 may transmit a configuration of one or more aperiodic CSI measurement resources for CSI reporting by the UE, the configuration being based on the threshold number of aperiodic CSI measurement resources, or the UE memory size, or a combination thereof. In some examples, the configuration manager 1420 may configure a first parameter set for a first CSI report associated with a first type of codebook and a second parameter set for a second CSI report associated with a second type of codebook that differs from the first type of codebook. In some examples, the configuration manager 1420 may configure a rank threshold value associated with the first CSI report based on the first parameter set. In some cases, the first type of codebook includes a Type II CSI codebook.

The CSI triggering manager 1425 may transmit, to the UE, DCI triggering the CSI reporting for a subset of aperiodic CSI measurement resources of the one or more aperiodic CSI measurement resources. In some examples, the CSI triggering manager 1425 may transmit, to the UE, DCI triggering the first CSI report, or the second CSI report, or a combination thereof.

The CSI report manager 1430 may receive, from the UE, the first CSI report, or the second CSI report, or a combination thereof, based on the received DCI, where the first CSI report is based on the first parameter set, the second CSI report is based on the second parameter set, or a combination thereof. In some examples, the CSI report manager 1430 may receive the first CSI report over the one or more aperiodic CSI measurement resources. In some cases, the first CSI report includes a wide band CSI report.

In some examples, the CSI report manager 1430 may receive the first CSI report based at least in part on the first set of CSI computation times. In some examples, the CSI report manager 1430 may receive the second CSI report based at least in part on the second set of CSI computation times. In some cases, the CSI report manager 1430 may receiving the first CSI report excluding a rank indicator based at least in part on the rank threshold value.

The computation time manager 1435 may configure a first set of CSI computation times associated with the first CSI report, the first set of CSI computation times being different from a second set of CSI computation times associated with the second CSI report. In some examples, the computation time manager 1435 may configure the second set of CSI computation times associated with the second CSI report, the second set of CSI computation times being different from the first set of CSI computation times associated with the first CSI report.

The parameter manager 1440 may transmit, to the UE, an indication of the first parameter set and the second parameter set. In some cases, at least a portion of the first parameter set is different from the second parameter set.

Figure 15:
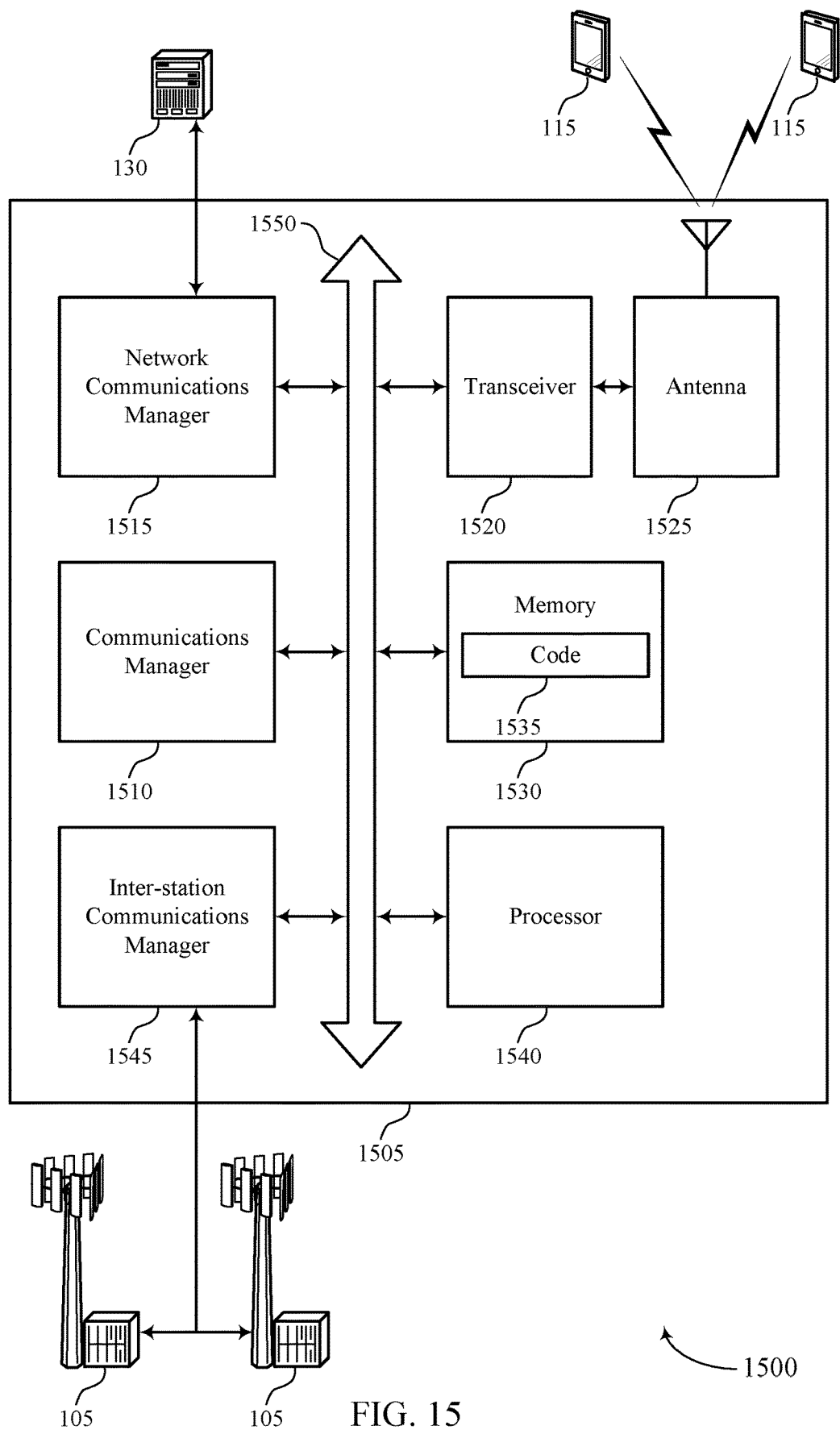
FIG. 15 shows a diagram of a system including a device that supports techniques for simplifying CSI feedback in accordance with aspects of the present disclosure.

FIG. 15 shows a diagram of a system 1500 including a device 1505 that supports techniques for simplifying CSI feedback in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may receive, from a UE, a capability report including an indication of CSI reporting capability supported by the UE, identify, based on the received capability report, a threshold number of aperiodic CSI measurement resources, a UE memory size associated with buffering aperiodic CSI measurement resources, or a combination thereof, transmit a configuration of one or more aperiodic CSI measurement resources for CSI reporting by the UE, the configuration being based on the threshold number of aperiodic CSI measurement resources, or the UE memory size, or a combination thereof, and transmit, to the UE, DCI triggering the CSI reporting for a subset of aperiodic CSI measurement resources of the one or more aperiodic CSI measurement resources.

Additionally or alternatively, the communications manager 1510 may also configure a first parameter set for a first CSI report associated with a first type of codebook and a second parameter set for a second CSI report associated with a second type of codebook that differs from the first type of codebook, transmit, to a UE, DCI triggering the first CSI report, or the second CSI report, or a combination thereof, and receive, from the UE, the first CSI report, or the second CSI report, or a combination thereof, based on the received DCI, where the first CSI report is based on the first parameter set, the second CSI report is based on the second parameter set, or a combination thereof.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting techniques for simplifying CSI feedback).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
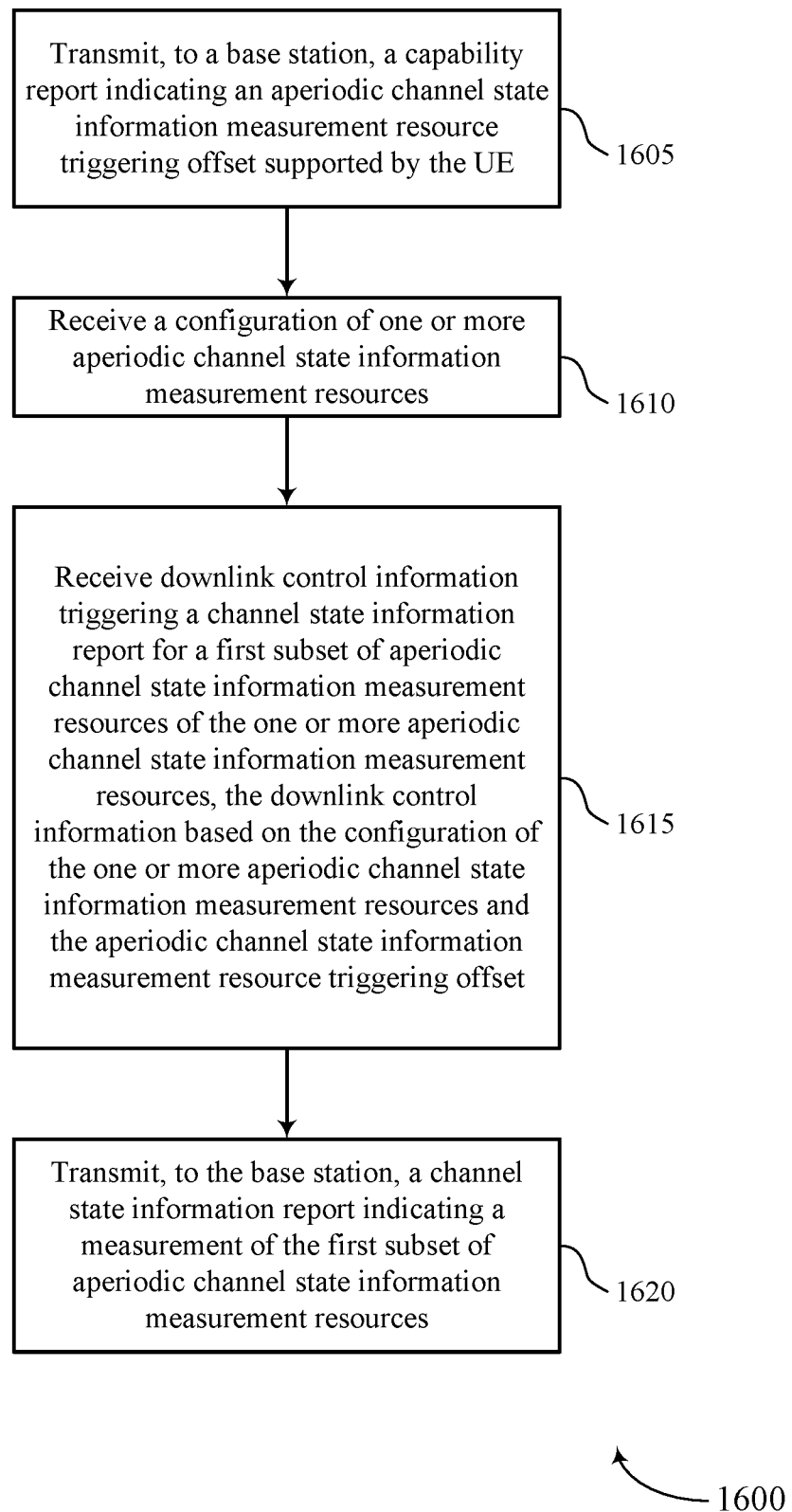
FIGS. 16 through 20 show flowcharts illustrating methods that support techniques for simplifying CSI feedback in accordance with aspects of the present disclosure.

FIG. 16 shows a flowchart illustrating a method 1600 that supports techniques for simplifying CSI feedback in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may transmit, to a base station, a capability report indicating an aperiodic CSI measurement resource triggering offset supported by the UE. The operations of 1605 may be performed according to the methods described herein. In some examples, aspects of the operations of 1605 may be performed by a UE capability component as described with reference to FIGS. 8 through 11.

At 1610, the UE may receive a configuration of one or more aperiodic CSI measurement resources. The operations of 1610 may be performed according to the methods described herein. In some examples, aspects of the operations of 1610 may be performed by a CSI manager as described with reference to FIGS. 8 through 11.

At 1615, the UE may receive DCI triggering a CSI report for a first subset of aperiodic CSI measurement resources of the one or more aperiodic CSI measurement resources, the DCI based on the configuration of the one or more aperiodic CSI measurement resources and the aperiodic CSI measurement resource triggering offset. The operations of 1615 may be performed according to the methods described herein. In some examples, aspects of the operations of 1615 may be performed by a CSI manager as described with reference to FIGS. 8 through 11.

At 1620, the UE may transmit, to the base station, a CSI report indicating a measurement of the first subset of aperiodic CSI measurement resources. The operations of 1620 may be performed according to the methods described herein. In some examples, aspects of the operations of 1620 may be performed by a CSI transmission component as described with reference to FIGS. 8 through 11.

Figure 17:
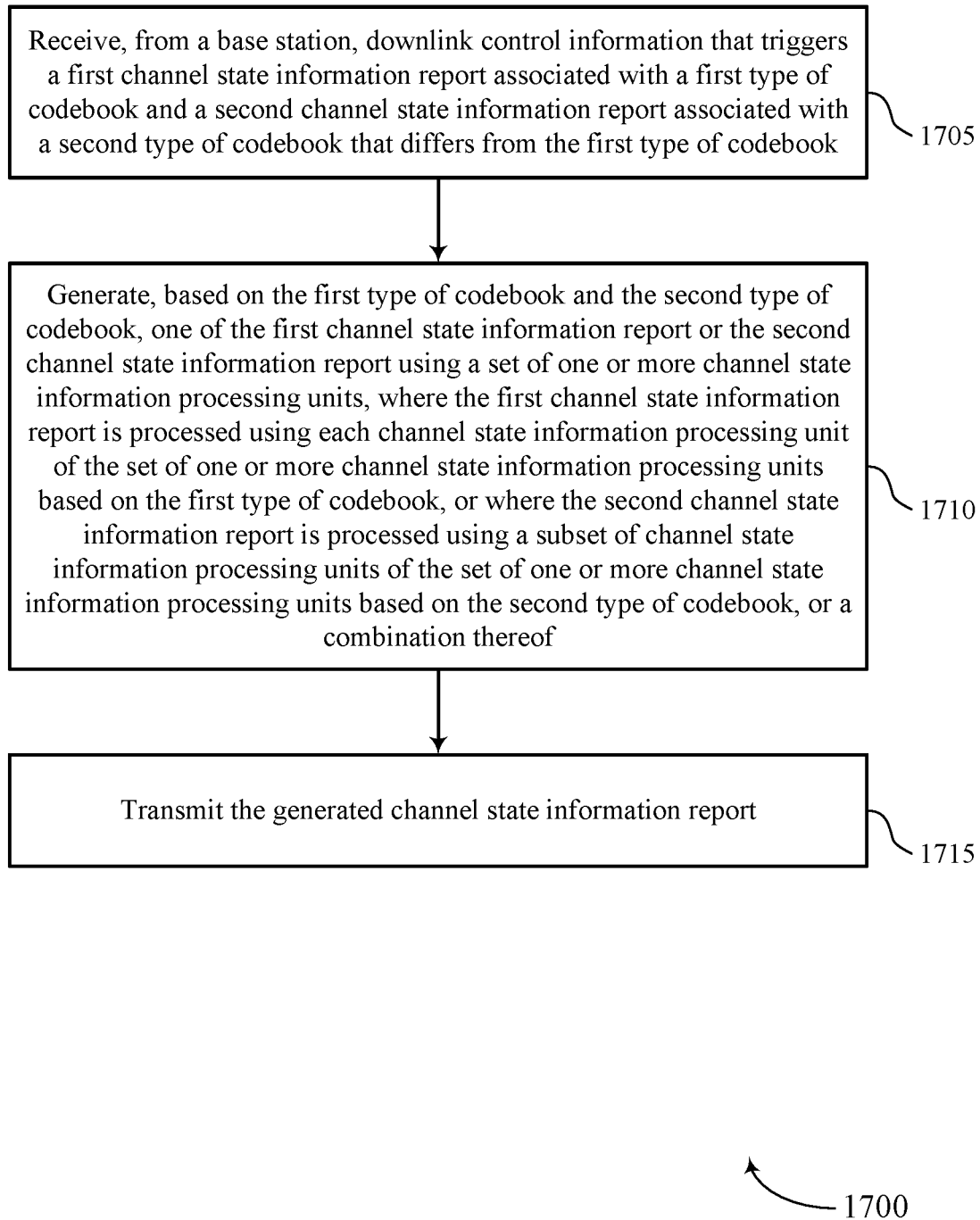

FIG. 17 shows a flowchart illustrating a method 1700 that supports techniques for simplifying CSI feedback in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, DCI that triggers a first CSI report associated with a first type of codebook and a second CSI report associated with a second type of codebook that differs from the first type of codebook. The operations of 1705 may be performed according to the methods described herein. In some examples, aspects of the operations of 1705 may be performed by a CSI manager as described with reference to FIGS. 8 through 11.

At 1710, the UE may generate, based on the first type of codebook and the second type of codebook, one of the first CSI report or the second CSI report using a set of one or more CSI processing units, where the first CSI report is processed using each CSI processing unit of the set of one or more CSI processing units based on the first type of codebook, or where the second CSI report is processed using a subset of CSI processing units of the set of one or more CSI processing units based on the second type of codebook, or a combination thereof. The operations of 1710 may be performed according to the methods described herein. In some examples, aspects of the operations of 1710 may be performed by a CSI generation component as described with reference to FIGS. 8 through 11.

At 1715, the UE may transmit the generated CSI report. The operations of 1715 may be performed according to the methods described herein. In some examples, aspects of the operations of 1715 may be performed by a CSI transmission component as described with reference to FIGS. 8 through 11.

Figure 18:
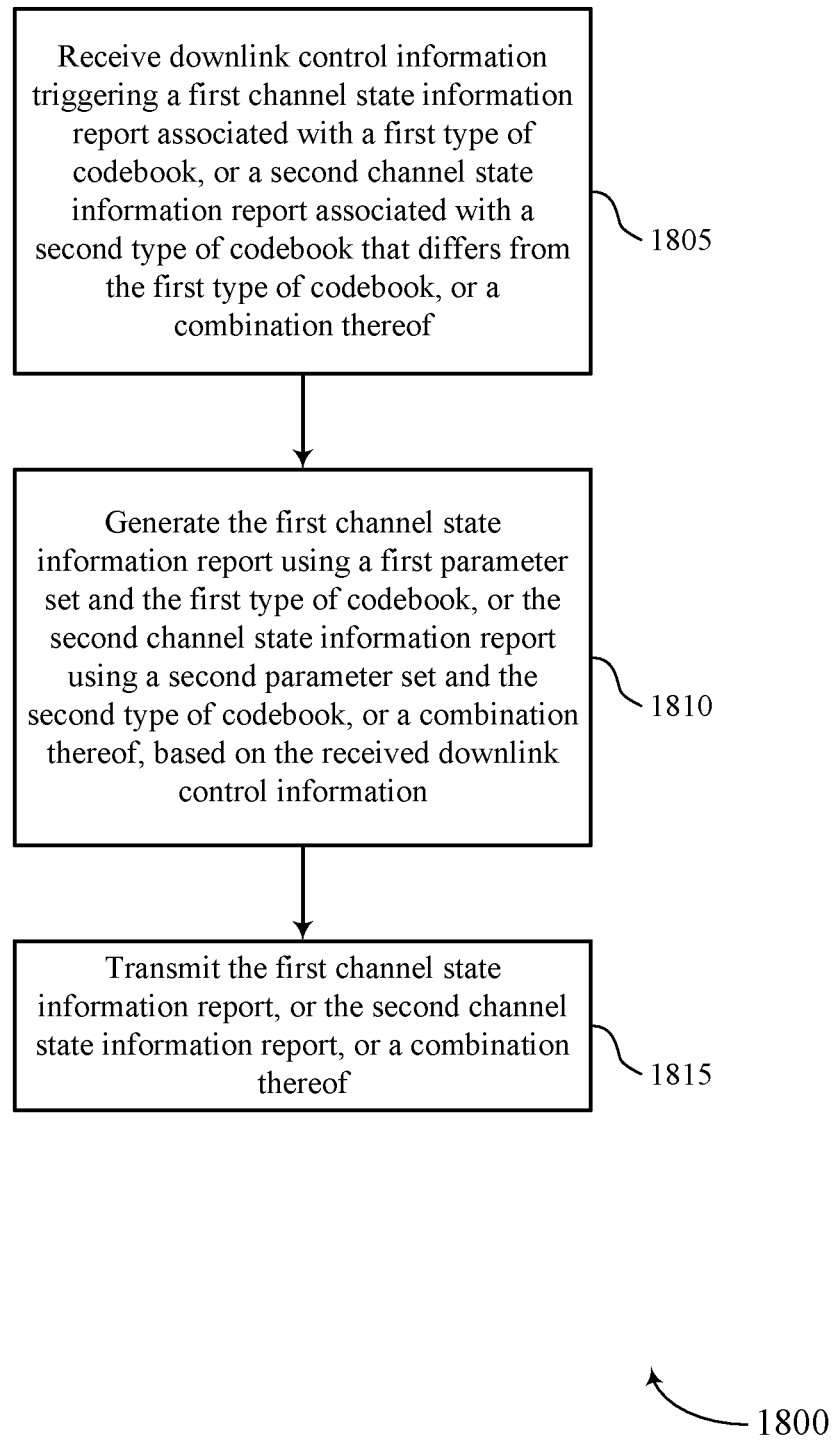

FIG. 18 shows a flowchart illustrating a method 1800 that supports techniques for simplifying CSI feedback in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may receive DCI triggering a first CSI report associated with a first type of codebook, or a second CSI report associated with a second type of codebook that differs from the first type of codebook, or a combination thereof. The operations of 1805 may be performed according to the methods described herein. In some examples, aspects of the operations of 1805 may be performed by a CSI manager as described with reference to FIGS. 8 through 11.

At 1810, the UE may generate the first CSI report using a first parameter set and the first type of codebook, or the second CSI report using a second parameter set and the second type of codebook, or a combination thereof, based on the received DCI. The operations of 1810 may be performed according to the methods described herein. In some examples, aspects of the operations of 1810 may be performed by a CSI generation component as described with reference to FIGS. 8 through 11.

At 1815, the UE may transmit the first CSI report, or the second CSI report, or a combination thereof. The operations of 1815 may be performed according to the methods described herein. In some examples, aspects of the operations of 1815 may be performed by a CSI transmission component as described with reference to FIGS. 8 through 11.

Figure 19:
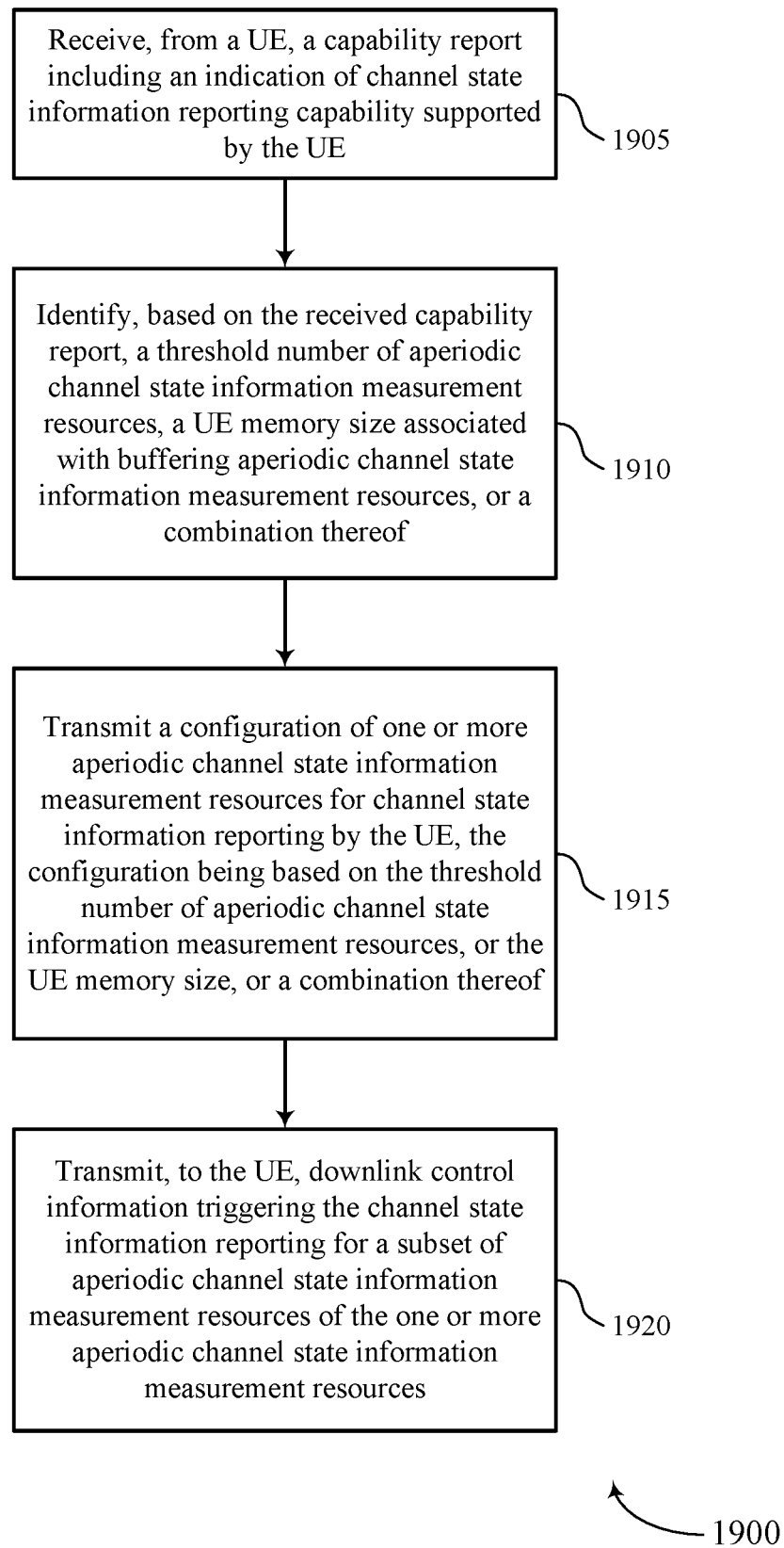

FIG. 19 shows a flowchart illustrating a method 1900 that supports techniques for simplifying CSI feedback in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a UE, a capability report including an indication of CSI reporting capability supported by the UE. The operations of 1905 may be performed according to the methods described herein. In some examples, aspects of the operations of 1905 may be performed by a capability manager as described with reference to FIGS. 12 through 15.

At 1910, the base station may identify, based on the received capability report, a threshold number of aperiodic CSI measurement resources, a UE memory size associated with buffering aperiodic CSI measurement resources, or a combination thereof. The operations of 1910 may be performed according to the methods described herein. In some examples, aspects of the operations of 1910 may be performed by a CSI measurement resource manager as described with reference to FIGS. 12 through 15.

At 1915, the base station may transmit a configuration of one or more aperiodic CSI measurement resources for CSI reporting by the UE, the configuration being based on the threshold number of aperiodic CSI measurement resources, or the UE memory size, or a combination thereof. The operations of 1915 may be performed according to the methods described herein. In some examples, aspects of the operations of 1915 may be performed by a configuration manager as described with reference to FIGS. 12 through 15.

At 1920, the base station may transmit, to the UE, DCI triggering the CSI reporting for a subset of aperiodic CSI measurement resources of the one or more aperiodic CSI measurement resources. The operations of 1920 may be performed according to the methods described herein. In some examples, aspects of the operations of 1920 may be performed by a CSI triggering manager as described with reference to FIGS. 12 through 15.

Figure 20:
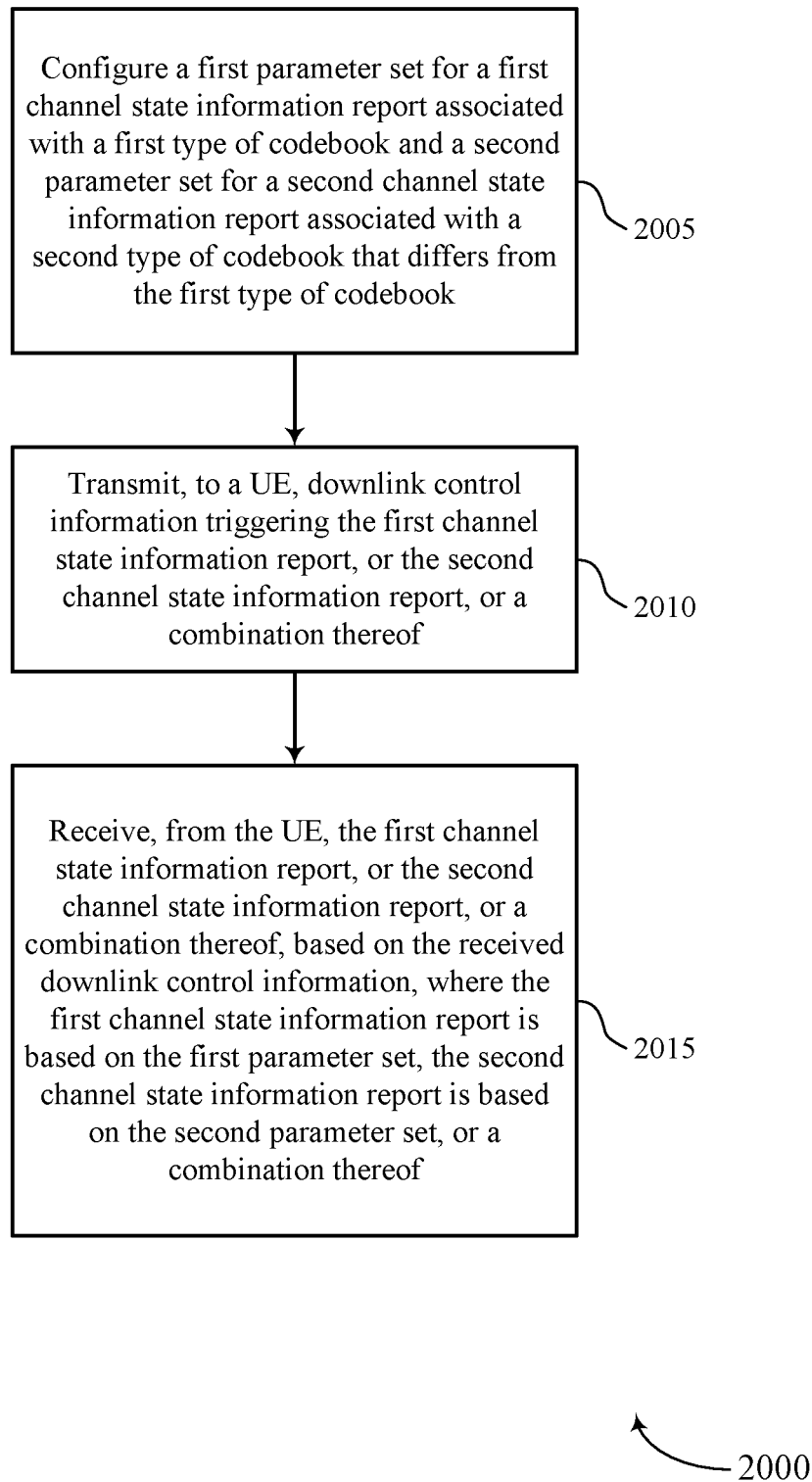

FIG. 20 shows a flowchart illustrating a method 2000 that supports techniques for simplifying CSI feedback in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2005, the base station may configure a first parameter set for a first CSI report associated with a first type of codebook and a second parameter set for a second CSI report associated with a second type of codebook that differs from the first type of codebook. The operations of 2005 may be performed according to the methods described herein. In some examples, aspects of the operations of 2005 may be performed by a configuration manager as described with reference to FIGS. 12 through 15.

At 2010, the base station may transmit, to a UE, DCI triggering the first CSI report, or the second CSI report, or a combination thereof. The operations of 2010 may be performed according to the methods described herein. In some examples, aspects of the operations of 2010 may be performed by a CSI triggering manager as described with reference to FIGS. 12 through 15.

At 2015, the base station may receive, from the UE, the first CSI report, or the second CSI report, or a combination thereof, based on the received DCI, where the first CSI report is based on the first parameter set, the second CSI report is based on the second parameter set, or a combination thereof. The operations of 2015 may be performed according to the methods described herein. In some examples, aspects of the operations of 2015 may be performed by a CSI report manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting a capability report indicating an aperiodic channel state information measurement resource triggering offset supported by the UE, the capability report indicating the aperiodic channel state information measurement resource triggering offset that is a threshold duration after which the UE is capable of receiving one or more aperiodic channel state information measurement resources relative to receiving downlink control information;
    receiving a configuration of the one or more aperiodic channel state information measurement resources;
    receiving the downlink control information triggering a channel state information report for a first subset of aperiodic channel state information measurement resources of the one or more aperiodic channel state information measurement resources, the downlink control information based at least in part on the configuration of the one or more aperiodic channel state information measurement resources and the aperiodic channel state information measurement resource triggering offset; and
    transmitting the channel state information report indicating a measurement of the first subset of aperiodic channel state information measurement resources.

2. The method of claim 1, wherein transmitting the capability report comprises:
    transmitting the capability report indicating the aperiodic channel state information measurement resource triggering offset that indicates a processing time supported by the UE for decoding the downlink control information.

3. The method of claim 1, wherein the aperiodic channel state information measurement resource triggering offset indicates one or more symbol periods, one or more slot durations, or a combination thereof.

4. The method of claim 1, wherein transmitting the capability report comprises:
    transmitting the capability report indicating a threshold number of aperiodic channel state information measurement resources associated with the channel state information report that the UE is capable of measuring, wherein the channel state information report comprises a measurement for at least one of the one or more aperiodic channel state information measurement resources up to the threshold number of aperiodic channel state information measurement resources.

5. The method of claim 4, wherein the threshold number of aperiodic channel state information measurement resources indicates a maximum number of aperiodic channel state information measurement resources associated with the channel state information report that the UE is capable of measuring.

6. The method of claim 1, wherein transmitting the capability report comprises:
    transmitting the capability report comprising an indication of a buffering memory size, wherein the configuration of the one or more aperiodic channel state information measurement resources is based at least in part on the buffering memory size.

7. The method of claim 1, wherein the channel state information report comprises an aperiodic channel state information report.

8. A method for wireless communication at a user equipment (UE), comprising:
receiving downlink control information that triggers a first channel state information report associated with a first type of codebook and a second channel state information report associated with a second type of codebook that differs from the first type of codebook;
identifying that the second channel state information report has a higher priority than the first channel state information report;
generating, based at least in part on the first type of codebook and the second type of codebook, the second channel state information report using a set of one or more channel state information processing units, wherein the second channel state information report is processed using at least a subset of channel state information processing units of the set of one or more channel state information processing units based at least in part on the second type of codebook;
refraining from updating the first channel state information report based at least in part on using at least the subset of channel state information processing units of the set of one or more channel state information processing units for generating the second channel state information report; and
transmitting the generated second channel state information report.

9. The method of claim 8, wherein the first type of codebook comprises a Type II channel state information codebook.

10. A method for wireless communication at a user equipment (UE), comprising:
transmitting a capability report comprising a first capability indication of a UE capability for concurrent generation of a first channel state information report and a second channel state information report, a second capability indication for generation of the first channel state information report individually, a third capability indication for generation of the second channel state information report individually, or a combination thereof;
receiving downlink control information triggering the first channel state information report associated with a first type of codebook, or the second channel state information report associated with a second type of codebook that differs from the first type of codebook, or a combination thereof;
generating the first channel state information report using a first parameter set and the first type of codebook, or the second channel state information report using a second parameter set and the second type of codebook, or a combination thereof, based at least in part on the received downlink control information; and
transmitting the first channel state information report, or the second channel state information report, or a combination thereof.

11. The method of claim 10, wherein generating the first channel state information report comprises:
identifying, from the first parameter set, a first set of channel state information computation times associated with the first channel state information report, the first set of channel state information computation times being different from a second set of channel state information computation times associated with the second channel state information report, the method further comprising:
transmitting the first channel state information report based at least in part on the first set of channel state information computation times.

12. The method of claim 11, wherein generating the second channel state information report comprises:
identifying, from the second parameter set, the second set of channel state information computation times associated with the second channel state information report, the second set of channel state information computation times being different from the first set of channel state information computation times associated with the first channel state information report, the method further comprising:
transmitting the second channel state information report based at least in part on the second set of channel state information computation times.

13. The method of claim 10, wherein generating the first channel state information report comprises:
identifying a rank threshold value associated with the first channel state information report based at least in part on the first parameter set, the method further comprising, the method further comprising:
transmitting the first channel state information report excluding a rank indicator based at least in part on the rank threshold value.

14. The method of claim 10, further comprising:
identifying a first set of one or more aperiodic channel state information measurement resources based at least in part on the first parameter set, the first set of one or more aperiodic channel state information measurement resources being configured for aperiodic channel state information reporting, the method further comprising:
transmitting the first channel state information report that is generated based at least in part on measurement of the first set of one or more aperiodic channel state information measurement resources.

15. The method of claim 10, wherein the first channel state information report comprises a wide band channel state information report.

16. The method of claim 10, further comprising:
receiving an indication of the first parameter set and the second parameter set.

17. The method of claim 10, wherein the first type of codebook comprises a Type II channel state information codebook.

18. The method of claim 10, wherein at least a portion of the first parameter set is different from the second parameter set.

19. A method for wireless communication at a network device, comprising:
receiving a capability report;
identifying, from the capability report, a first capability indication for concurrent generation of a first channel state information report and a second channel state information report, a second capability indication for generation of the first channel state information report individually, a third capability indication for generation of the second channel state information report individually, or a combination thereof;
configuring a first parameter set for the first channel state information report associated with a first type of codebook and a second parameter set for the second channel state information report associated with a second type of codebook that differs from the first type of codebook;

transmitting downlink control information triggering the first channel state information report, or the second channel state information report, or a combination thereof; and receiving the first channel state information report, or the second channel state information report, or a combination thereof, based at least in part on the received downlink control information, wherein the first channel state information report is based at least in part on the first parameter set, the second channel state information report is based at least in part on the second parameter set, or a combination thereof.

20. The method of claim 19, further comprising:

configuring a first set of channel state information computation times associated with the first channel state information report, the first set of channel state information computation times being different from a second set of channel state information computation times associated with the second channel state information report, the method further comprising:

receiving the first channel state information report based at least in part on the first set of channel state information computation times.

21. The method of claim 20, further comprising:

configuring the second set of channel state information computation times associated with the second channel state information report, the second set of channel state information computation times being different from the first set of channel state information computation times associated with the first channel state information report, the method further comprising:

receiving the second channel state information report based at least in part on the second set of channel state information computation times.

22. The method of claim 19, further comprising:

configuring a rank threshold value associated with the first channel state information report based at least in part on the first parameter set, the method further comprising, the method further comprising:

receiving the first channel state information report excluding a rank indicator based at least in part on the rank threshold value.

23. The method of claim 19, further comprising:

configuring a first set of one or more aperiodic channel state information measurement resources based at least in part on the first parameter set, the first set of one or more aperiodic channel state information measurement resources being configured for aperiodic channel state information reporting, the method further comprising:

receiving the first channel state information report over the first set of one or more aperiodic channel state information measurement resources.

24. The method of claim 19, wherein the first channel state information report comprises a wide band channel state information report.

25. The method of claim 19, further comprising:

transmitting an indication of the first parameter set and the second parameter set.

* * * * *